(12) United States Patent
Choi et al.

(10) Patent No.: US 11,589,339 B2
(45) Date of Patent: Feb. 21, 2023

(54) METHOD AND DEVICE FOR CONFIGURING UPLINK CONTROL CHANNEL IN WIRELESS CELLULAR COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Gyeonggi-do (KR); Taehyoung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/255,760

(22) PCT Filed: Jul. 3, 2019

(86) PCT No.: PCT/KR2019/008116
§ 371 (c)(1),
(2) Date: Dec. 23, 2020

(87) PCT Pub. No.: WO2020/009463
PCT Pub. Date: Jan. 9, 2020

(65) Prior Publication Data
US 2021/0274485 A1    Sep. 2, 2021

(30) Foreign Application Priority Data

Jul. 3, 2018 (KR) .................. 10-2018-0077255

(51) Int. Cl.
*H04W 72/04* (2009.01)
*H04B 1/713* (2011.01)
*H04W 72/044* (2023.01)

(52) U.S. Cl.
CPC ........ *H04W 72/0406* (2013.01); *H04B 1/713* (2013.01); *H04W 72/044* (2013.01)

(58) Field of Classification Search
CPC ........... H04W 72/0406; H04W 72/044; H04W 72/0413; H04W 72/042; H04W 72/0466;
(Continued)

(56) References Cited

U.S. PATENT DOCUMENTS

2013/0039307 A1* 2/2013 Han ..................... H04L 5/0055
370/329
2014/0071928 A1* 3/2014 Papasakellariou ... H04B 7/0417
370/329

(Continued)

FOREIGN PATENT DOCUMENTS

KR      20190009670    1/2019
WO    WO 2018/112322    6/2018

OTHER PUBLICATIONS

Samsung, "Resource Allocation for PUCCH Transmission", R1-1720333, 3GPP TSG RAN WG1 Meeting 91, Nov. 27-Dec. 1, 2017, 7 pages.

(Continued)

*Primary Examiner* — Ayaz R Sheikh
*Assistant Examiner* — Tarell A Hampton
(74) *Attorney, Agent, or Firm* — The Farrell Law Firm, P.C.

(57) ABSTRACT

The present disclosure relates to: a communication technique for converging an IoT technology and a 5G communication system for supporting a higher data transfer rate beyond a 4G system; and a system therefor. The present disclosure can be applied to an intelligent service (for example, a smart home, a smart building, a smart city, a smart car or connected car, health care, digital education, retail business, security and safety-related service, etc.) on the basis of a 5G communication technology and an IoT-related technology. The present invention relates to a method for transmitting uplink control information (UCI) by a terminal in a wireless communication system, the method (Continued)

comprising: receiving physical uplink control channel (PUCCH) configuration information from a base station; and transmitting, to the base station, UCI in a PUCCH to which PUCCH format 1 has been applied on the basis of the PUCCH configuration information, wherein the PUCCH configuration information contains spreading code index information, and the spreading code index information is determined on the basis of the length of a spreading code to be applied to symbols through which the UCI is to be transmitted, among symbols through which the PUCCH is to be transmitted.

15 Claims, 12 Drawing Sheets

(58) Field of Classification Search
CPC ..... H04B 1/713; H04L 5/0016; H04L 5/0091; H04L 5/0053; H04L 5/0012
See application file for complete search history.

(56) References Cited

U.S. PATENT DOCUMENTS

| | | |
|---|---|---|
| 2017/0374656 A1 | 12/2017 | Kim et al. |
| 2019/0159191 A1* | 5/2019 | Kim ................... H04L 5/0094 |
| 2019/0174440 A1* | 6/2019 | Kwak ............... H04W 56/0015 |
| 2020/0187226 A1 | 6/2020 | Choe et al. |

OTHER PUBLICATIONS

European Search Report dated Jun. 18, 2021 issued in counterpart application No. 19829900.0-1215, 13 pages.
Huawei, HiSilicon, "Review Summary for AI 7.3.2.2 PUCCH Structure in Long-Duration", R1-1801145, 3GPP TSG RAN WG1 Ad-Hoc Meeting, Jan. 22-26, 2018, 21 pages.
3GPP, 3GPP TS 38.211 V15.2.0, 3rd Generation Partnership Project; Technical Specification Group Radio Access Network; NR; Physical Channels and Modulation (Release 15), Jun. 27, 2018, 96 pages.
Korean Office Action dated Jul. 26, 2022 issued in counterpart application No. 10-2018-0077255, 8 pages.
PCT/ISA/210 Search Report issued on PCT/KR2019/008116, dated Oct. 31, 2019, pp. 5.
PCT/ISA/237 Written Opinion issued on PCT/KR2019/008116, dated Oct. 31, 2019, pp. 5.
3GPP TS 38.213 v15.2.0, '3GPP; TSGRAN: NR; Physical layer procedures for control (Release 15)', Jun. 29, 2018, pp. 101.
Catt, 'Remaining details of long PUCCH for up to 2 UCI bits', R1-1717828, 3GPP TSG-RAN WG1 Meeting 90bis, Prague, CZ, Oct. 3, 2017, pp. 8.
Ericsson, 'On the Design of Long PUCCH for up to 2 bits', R1-1718635, 3GPP TSG RAN WG1 Meeting#90bis, Prague, Czech Republic, Oct. 3, 2017, pp. 15.
NTT Docomo, Inc., 'Resource allocation for PUCCH', R1-1718214, 3GPP TSG RAN WG1 Meeting 90bis, Prague, CZ, Oct. 3, 2017, pp. 13.

* cited by examiner

METHOD AND DEVICE FOR CONFIGURING UPLINK CONTROL CHANNEL IN WIRELESS CELLULAR COMMUNICATION SYSTEM

PRIORITY

This application is a National Phase Entry of PCT International Application No. PCT/KR2019/008116 which was filed on Jul. 3, 2019, and claims priority to Korean Patent Application No. 10-2018-0077255, which was filed on Jul. 3, 2018, the content of each of which is incorporated herein by reference.

TECHNICAL FIELD

The disclosure relates to a method and a device for configuring an uplink control channel in a wireless cellular communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, various researches have been conducted on a method of transmitting an uplink control channel in a communication system. In particular, a method of transmitting a long physical uplink control channel (PUCCH) is under discussion in various aspects.

DETAILED DESCRIPTION OF INVENTION

Technical Problem

The disclosure relates to a method for configuring a long PUCCH format, in particular, PUCCH format 1, among NR PUCCH formats, and provides a method and a device for configuring an index of orthogonal cover code (OCC, which may be used interchangeably with spreading code) to support terminal multiplexing according to enablement or disablement of frequency hopping and the number of transmission symbols of PUCCH format 1 by enabling transmission of long PUCCHs in various numbers of symbols.

Solution to Problem

In order to solve the above problems, the disclosure provides a method of transmitting uplink control information (UCI) by a terminal in a wireless communication system, which includes receiving physical uplink control channel (PUCCH) configuration information from a base station and transmitting UCI to the base station through a PUCCH by applying PUCCH format 1 thereto, based on the PUCCH configuration information, wherein the PUCCH configuration information includes spreading code index information, and wherein the spreading code index information is determined based on the length of spreading code to be applied to the symbol in which the UCI is transmitted, among symbols in which the PUCCH is transmitted.

In addition, the PUCCH configuration information may further include information indicating whether frequency hopping is enabled or disabled, and if frequency hopping is enabled, the spreading code index information may be determined based on the length of spreading code to be applied to a symbol in which UCI is transmitted in a first hop and the length of spreading code to be applied to a symbol in which UCI is transmitted in a second hop, and if frequency hopping is disabled, the spreading code index information may be determined based on the length of spreading code to be applied to a symbol in which the UCI is transmitted.

In addition, if frequency hopping is enabled, the spreading code index information may be determined based on the smaller value of the length of spreading code to be applied to the symbol in which the UCI is transmitted in the first hop and the length of spreading code to be applied to the symbol in which the UCI is transmitted in the second hop, and the spreading code index information may be determined based on the minimum value of the length of spreading code to be applied according to the table below when frequency hopping is enabled or disabled.

| Transmission length of PUCCH format 1 | Spreading code length applied to symbols transmitting uplink control information in PUCCH format 1 when frequency hopping is disabled | Frequency hopping is enabled | |
| --- | --- | --- | --- |
| | | Spreading code length applied to symbols transmitting UCI in (first hop) before frequency hopping | Spreading code length applied to symbols transmitting UCI in (second hop) after frequency hopping |
| 4  | 2 | 1 | 1 |
| 5  | 2 | 1 | 1 |
| 6  | 3 | 1 | 2 |
| 7  | 3 | 1 | 2 |
| 8  | 4 | 2 | 2 |
| 9  | 4 | 2 | 2 |
| 10 | 5 | 2 | 3 |
| 11 | 5 | 7 | 3 |
| 12 | 6 | 3 | 3 |
| 13 | 6 | 3 | 3 |
| 14 | 7 | 3 | 4 |

In addition, a method of receiving uplink control information (UCI) by a base station in a wireless communication system includes transmitting physical uplink control channel (PUCCH) configuration information to a terminal and receiving, from the terminal, UCI to which PUCCH format 1 is applied through a PUCCH, based on the PUCCH configuration information, wherein the PUCCH configuration information includes spreading code index information, and wherein the spreading code index information is determined based on the length of spreading code to be applied to the symbol in which the UCI is transmitted, among symbols in which the PUCCH is transmitted.

In addition, a terminal for transmitting uplink control information (UCI) in a wireless communication system includes a transceiver and a controller connected to the transceiver and configured to receive physical uplink control channel (PUCCH) configuration information from a base station and perform control so as to transmit UCI to the base station through a PUCCH by applying PUCCH format 1 thereto, based on the PUCCH configuration information, wherein the PUCCH configuration information includes spreading code index information, and wherein the spreading code index information is determined based on the length of spreading code to be applied to a symbol in which the UCI is transmitted, among symbols in which the PUCCH is transmitted.

In addition, a base station for receiving uplink control information (UCI) in a wireless communication system includes a transceiver and a controller connected to the transceiver and configured to transmit physical uplink control channel (PUCCH) configuration information to a terminal and perform control so as to receive, from the terminal, UCI to which PUCCH format 1 is applied through a PUCCH, based on the PUCCH configuration information, wherein the PUCCH configuration information includes spreading code index information, and wherein the spreading code index information is determined based on the length of spreading code to be applied to the symbol in which the UCI is transmitted, among symbols in which the PUCCH is transmitted.

Advantageous Effects of Invention

According to the disclosure, it is possible to improve performance using frequency diversity according to frequency hopping and to provide coverage even when transmission power of a terminal is insufficient by applying spreading code to PUCCH format 1 according to frequency hopping and the number of transmission symbols of PUCCH format 1, and it is possible to multiplex transmission of signals of multiple terminals in one frequency resource by providing a method of configuring a spreading code index, based on a frequency hopping scheme of PUCCH format 1.

MODE FOR THE INVENTION

Figure 1:
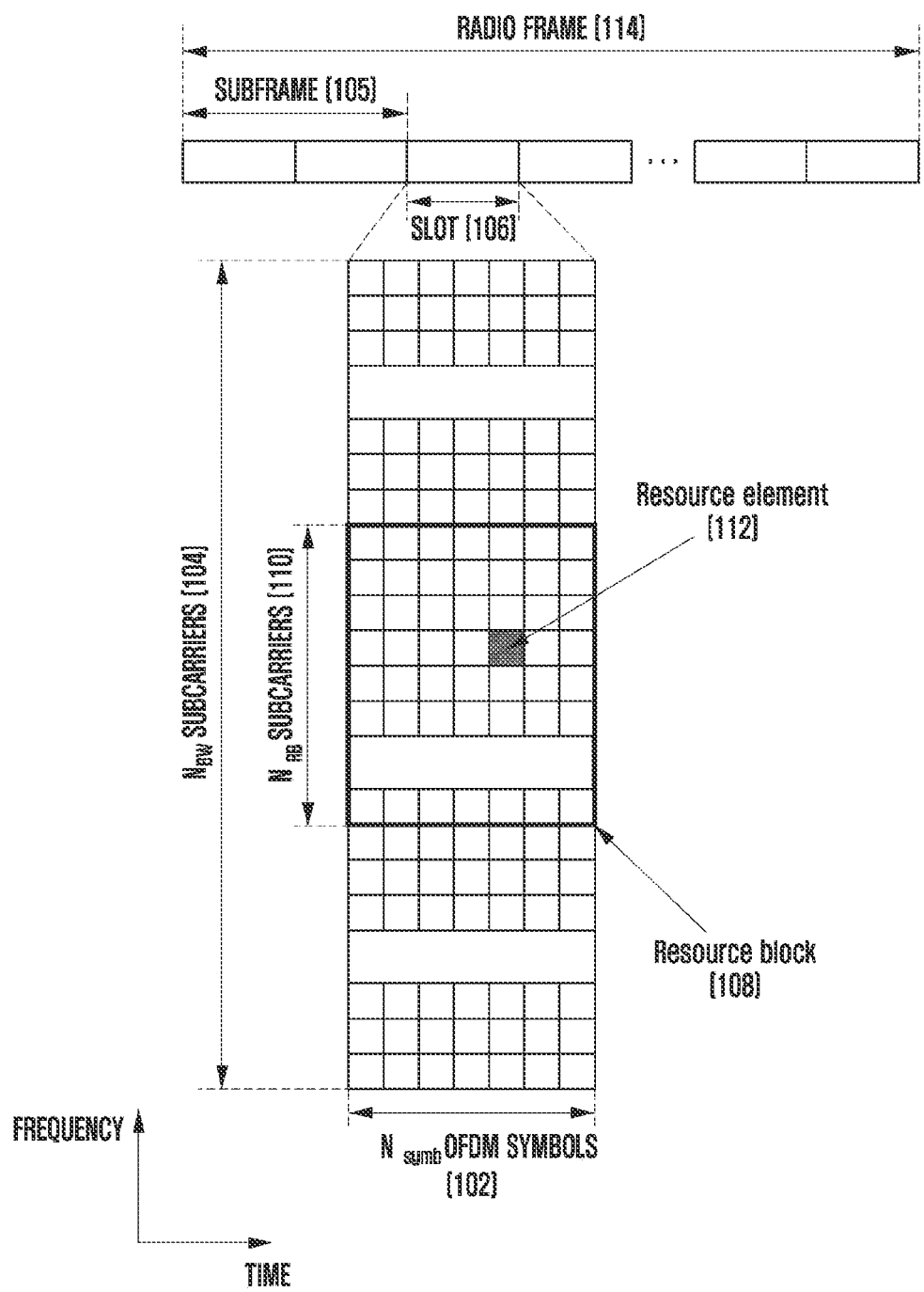
FIG. 1 is a diagram illustrating the fundamental structure of time and frequency domains in an LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this regard, the term "-unit" as used in the present embodiment refers to a software or hardware element, such as an FPGA or ASIC, and a "-unit" performs specific functions. However, the "unit" does not necessarily have a meaning limited to software or hardware. The "unit" may be configured either to be stored in an addressable storage medium or to execute one or more processors. Therefore, the "unit" includes, for example, elements such as software elements, object-oriented software elements, class elements, and task elements, processes, functions, attributes, procedures, sub-routines, segments of a program code, drivers, firmware, micro-codes, circuits, data, databases, data structures, tables, arrays, and parameters. A function provided inside elements and "-units" may be combined with a smaller number of elements and "-units" or divided into a larger number of elements and "-units". Moreover, elements and "-units" may be implemented to reproduce one or more CPUs within a device or a security multimedia card.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Further, the detailed description of embodiments of the disclosure will be directed to OFDM-based mobile communication systems, in particular, the 3GPP EUTRA standards, but based on determinations by those skilled in the art, the main idea of the disclosure may also be applied to other communication systems having similar technical backgrounds or channel types through some modifications without significantly departing from the scope of the disclosure.

In general, a mobile communication system has been developed to provide voice services while ensuring the mobility of a user. However, the mobile communication system is gradually expanding to data services, as well as voice services, and at present has developed to the extent of providing high-speed data services. However, mobile communication systems currently providing service are facing a shortage of resources, and a more advanced mobile communication system is required in order to meet user demand for higher-speed services.

As one of the next-generation mobile communication systems under development in response to the above demands, standardization of long-term evolution (LTE) is underway in the 3rd-generation partnership project (3GPP). LTE is technology for implementing high-speed packet-based communications with a transmission rate of up to 100 Mbps. To this end, various methods are under discussion. For example, a method of reducing the number of nodes located on communication paths by simplifying the structure of a network, a method of allowing wireless protocols to approximate wireless channels as closely as possible, and the like have been provided.

The LTE system employs a hybrid automatic repeat request (HARQ) scheme in which a physical layer resends corresponding data in the case of decoding failure upon initial transmission. The HARQ scheme is a technique in which a receiver transmits, to a transmitter, a negative acknowledgment (NACK) indicating decoding failure if the receiver fails to correctly decode the data, thereby enabling the transmitter to retransmit the corresponding data in a physical layer. The receiver combines data retransmitted by the transmitter with the data for which decoding previously failed, thereby improving data reception performance. In addition, if the receiver correctly decodes the data, the receiver may transmit, to the transmitter, an acknowledgment (ACK) indicating success of decoding so that the transmitter may transmit new data.

FIG. 1 is a diagram illustrating the fundamental structure of time and frequency domains, which are the radio resource domains in which data or a control channel is transmitted in a downlink in an LTE system.

In FIG. 1, the horizontal axis represents a time domain, and the vertical axis represents a frequency domain. The minimum transmission unit in the time domain is an orthogonal frequency division multiplexing (OFDM) symbol, wherein $N_{symb}$ OFDM symbols 102 constitute one slot 106, and two slots constitute one subframe 105. The slot has a length of 0.5 ms, and the subframe has a length of 1.0 ms. In addition, the radio frame 114 is a time domain unit including 10 subframes. The minimum transmission unit in the frequency domain is a subcarrier, and a transmission bandwidth of the entire system includes a total of $N_{BW}$ subcarriers 104.

The basic resource unit in the time and frequency domains is a resource element (RE) 112, which may be indicated by an OFDM symbol index and a subcarrier index. A resource block (RB) (or physical resource block (PRB)) 108 is defined by $N_{symb}$ consecutive OFDM symbols 102 in the time domain and $N_{RB}$ consecutive subcarriers 110 in the frequency domain. Thus, one RB 108 includes $N_{symb} \times N_{RB}$ REs 112. In general, the minimum transmission unit of data is the RB.

In the LTE system, $N_{symb}$=7 and $N_{RB}$=12, and $N_{BW}$ is proportional to the bandwidth of the system transmission band. The data rate increases in proportion to the number of RBs scheduled for the terminal. Six transmission bandwidths are defined to be operated in the LTE system. In the case of a frequency division duplex (FDD) system in which a downlink and an uplink are separated using frequency to be operated, the downlink transmission bandwidth and the uplink transmission bandwidth may be different from each other. A channel bandwidth indicates an RF bandwidth corresponding to the system transmission bandwidth. Table 1 below shows the relationship between the system transmission bandwidth and the channel bandwidth defined to correspond to each other in the LTE system. For example, an LTE system having a channel bandwidth of 10 MHz has a transmission bandwidth including 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration | 6 | 15 | 25 | 50 | 75 | 100 |

Downlink control information is transmitted using the first N OFDM symbols in the subframe. In general, N={1, 2, 3}. Therefore, the value N for each subframe varies with the amount of control information to be transmitted in the current subframe. The control information includes a control channel transmission interval indicator indicating the number of OFDM symbols for transmission of the control information, scheduling information on downlink data or uplink data, an HARQ ACK/NACK signal, and the like.

In the LTE system, scheduling information on downlink data or uplink data is transmitted from a base station to a terminal through downlink control information (DCI). Uplink (UL) refers to a radio link through which the terminal transmits data or control signals to the base station, and downlink (DL) refers to a radio link through which the base station transmits data or control signals to the terminal. The DCI is defined as various kinds of formats, and a DCI format is applied and operated, and is determined according to the scheduling information on uplink data (UL grant) or the scheduling information on downlink data (DL grant), according to whether or not the control information is a compact DCI having a small size, according to whether or not spatial multiplexing using multiple antennas is applied, or according to whether or not a DCI is intended for power control. For example, DCI format 1, which is the scheduling control information on downlink data (DL grant), is configured to include at least the following control information.

Resource allocation type 0/1 flag: this provides notification of resource allocation type 0 or 1. Type 0 allocates resources in units of resource block groups (RBGs) while applying a bitmap scheme. In the LTE system, the basic unit of scheduling is an RB indicated by time and frequency domain resources, and the RBG includes a plurality of RBs and becomes the basic unit of scheduling in type 0. Type 1 allocates a specific RB in the RBG.

Resource block assignment: this provides notification of the RBs allocated for transmission of data. The resources to be expressed are determined according to the system bandwidth and the resource allocation scheme.

Modulation and coding scheme (MCS): this provides notification of the modulation scheme used for transmission of data and the size of a transport block, which is the data to be transmitted.

HARQ process number: this provides notification of a HARQ process number.

New data indicator: this provides notification of HARQ initial transmission or retransmission.

Redundancy version: this provides notification of the redundancy version of HARQ.

Transmit power control (TPC) command for physical uplink control channel (PUCCH): this provides notification of a transmit power control command for a PUCCH, which is an uplink control channel.

The DCI goes through a channel coding and modulation process, and is then transmitted through a physical downlink control channel (PDCCH) or an enhanced PDCCH (EPDCCH), which is a downlink physical control channel. Hereinafter, PDCCH transmission/reception may be understood as transmission/reception of DCI through the PDCCH. Similarly, PDSCH transmission/reception may be understood as transmission/reception of downlink data through the PDSCH, and this technique may be applied to other channels.

In general, the DCI is channel-coded independently for each terminal, and is then configured and transmitted as an independent PDCCH. In the time domain, the PDCCH is mapped and transmitted during the control channel transmission interval. The frequency domain mapping position of the PDCCH is determined by an identifier (ID) of each terminal, and is spread over all system transmission bands.

The downlink data is transmitted through a physical downlink shared channel (PDSCH), which is a physical channel for transmission of downlink data. The PDSCH is transmitted after the control channel transmission interval, and notification of scheduling information, such as a specific mapping position in the frequency domain, the modulation scheme, and the like, is provided by the DCI transmitted through the PDCCH.

The base station notifies the terminal of the modulation scheme applied to the PDSCH to be transmitted to the terminal and the size of the data {transport block size (TBS)} to be transmitted through an MCS of 5 bits, among the control information constituting the DCI. The TBS corresponds to the size before channel coding for error correction is applied to the data {transport block (TB)} to be transmitted by the base station.

The modulation schemes supported by the LTE system are quadrature phase shift keying (QPSK), 16-quadrature amplitude modulation (QAM), and 64QAM, and their modulation orders ($Q_m$) correspond to 2, 4, and 6, respectively. That is, 2 bits per symbol may be transmitted in QPSK modulation, 4 bits per symbol may be transmitted in 16QAM, and 6 bits per symbol may be transmitted in 64QAM.

3GPP LTE Release 10 adopts bandwidth extension technology in order to support a higher data rate than LTE Release 8. The above technique, called "bandwidth extension" or "carrier aggregation (CA)", may extend a band so as to increase the amount of transmitted data to the extent of the extended band, compared to an LTE Release 8 terminal, which transmits data in a single band. Each of the above bands is referred to as a "component carrier (CC)", and the LTE Release 8 terminal is defined to have one component carrier for each of the downlink and the uplink. In addition, a downlink component carrier and an uplink component carrier, which is connected thereto through an SIB-2, are bundled and referred to as a "cell". The SIB-2 connection relationship between the downlink component carrier and the uplink component carrier is transmitted through a system signal or a higher-layer signal. The terminal supporting the CA may receive downlink data and transmit uplink data through a plurality of serving cells.

If it is difficult for a base station to transmit a PDCCH to a specific terminal in a specific serving cell in Release 10, the base station may transmit the PDCCH in another serving cell, and may configure a carrier indicator field (CIF) indicating that the corresponding PDCCH indicates a physical downlink shared channel (PDSCH) or a physical uplink shared channel (PUSCH), through which uplink data is transmitted, in another serving cell. The CIF may be configured with respect to a terminal supporting the CA. The CIF is determined by adding 3 bits to PDCCH information in a specific serving cell so as to indicate another serving cell. The CIF is included only when performing cross carrier scheduling, and if the CIF is not included, cross carrier scheduling is not performed. If the CIF is included in downlink allocation information (DL assignment), the CIF indicates the serving cell in which a PDSCH scheduled by the downlink allocation information is transmitted, and if the CIF is included in the uplink allocation information (UL grant), the CIF is defined to indicate a serving cell in which a PUSCH scheduled by the uplink allocation information is transmitted.

As described above, carrier aggregation (CA), which is a bandwidth extension technique, may be defined so that a plurality of serving cells may be configured with respect to the terminal in LTE Release 10. In addition, the terminal periodically or aperiodically transmits channel information on the plurality of serving cells to the base station for data scheduling of the base station. The base station schedules data for each carrier and transmits the data, and the terminal transmits A/N feedback on data transmitted for each carrier. LTE Release 10 was designed such that the terminal transmits up to 21 bits of A/N feedback and such that if the transmission of the A/N feedback and the transmission of the channel information are simultaneously performed in one subframe, the terminal transmits the A/N feedback while discarding the channel information. LTE Release 11 was designed such that channel information of one cell is multiplexed with the A/N feedback so as to transmit up to 22 bits of A/N feedback and channel information of one cell using PUCCH format 3 in a transmission resource of PUCCH format 3.

LTE Release 13 assumes a maximum of 32 serving cell configuration scenarios, and thus a concept of extending the number of serving cells up to 32 using unlicensed bands, as well as licensed bands, has been introduced. In addition, considering that the number of licensed bands, such as LTE frequencies, is limited, a technique called "licensed assisted access (LAA)" has been introduced to provide LTE services in unlicensed bands such as a 5 GHz band. The LAA provides support such that an LTE cell, which is a licensed band, is operated as a P cell and an LAA cell, which is an unlicensed band, is operated as an S cell by applying carrier aggregation in LTE. Therefore, the feedback produced in the LAA cell as an S cell must be transmitted only in the P cell as in LTE, and a downlink subframe and an uplink subframe may be freely applied to the LAA cell. LTE is to be understood to encompass all technologies evolved from LTE, such as LTE-A and LAA, unless otherwise stated herein.

Meanwhile, a $5^{th}$-generation wireless cellular communication system (hereinafter, referred to as "5G" or "NR" in the specification), which is a communication system subsequent to LTE, is required to flexibly meet various requirements of users, service providers, and the like, and thus services satisfying various requirements may be supported through 5G.

Therefore, 5G may be defined as technology for satisfying requirements selected for respective 5G services, such as enhanced mobile broadband (eMBB), massive machine-type communication (mMTC), ultra-reliable and low-latency communication (URLLC), and the like, from among requirements such as a maximum terminal transmission rate of 20 Gbps, a maximum terminal speed of 500 km/h, a maximum latency time of 0.5 ms, a terminal connection density of 1,000,000 terminals/km², and the like.

For example, in order to provide eMBB services in 5G, it is required to provide a maximum terminal transmission rate of 20 Gbps in the downlink and a maximum terminal transmission rate of 10 Gbps in the uplink with respect to one base station. In addition, the average experienced transmission speed of the terminal must be increased. In order to meet the requirements described above, there is a need for improved transmission and reception techniques including a more improved multiple-input multiple-output (MIMO) transmission technique.

In addition, mMTC is being considered to support application services such as the Internet of Things (IoT) in 5G. mMTC has requirements, such as support of connection of a large number of terminals in a cell, enhancement of the terminal coverage, increased battery lifetime, and a reduction in the cost of a terminal, in order to effectively provide the Internet of Things. Since the Internet of Things is provided to various sensors and various devices to thus provide a communication function, it must support a large number of terminals (e.g., 1,000,000 terminals/km²) in the cell. In addition, mMTC requires a wider coverage than eMBB because the terminals are likely to be located in shadow areas such as the basement of a building, an area that is not covered by a cell, or the like due to the nature of the service. mMTC requires a very long battery lifetime because it is likely to be configured as a low-cost terminal, and it is difficult to frequently replace the battery of the terminal.

Lastly, URLLC, which is used for remote control of robots or machines, industrial automation, unmanned aerial vehicles, remote health control, emergency notifications, and the like, must provide cellular-based wireless communication having ultra-low latency and high reliability for specific purposes. For example, the URLLC must satisfy a maximum latency time of less than 0.5 ms, and must also provide a packet error rate of $10^{-5}$ or less. Therefore, a transmission time interval (TTI) smaller than that of 5G services, such as eMBB, must be provided for URLLC, and a design for allocating wide resources in a frequency band is also required.

The services considered in the $5^{th}$-generation wireless cellular communication system described above must be provided as a single framework. That is, for efficient resource management and control, it is preferable to integrate the respective services into a single system under which to perform control and transmission, instead of operating the respective services independently.

Figure 2:
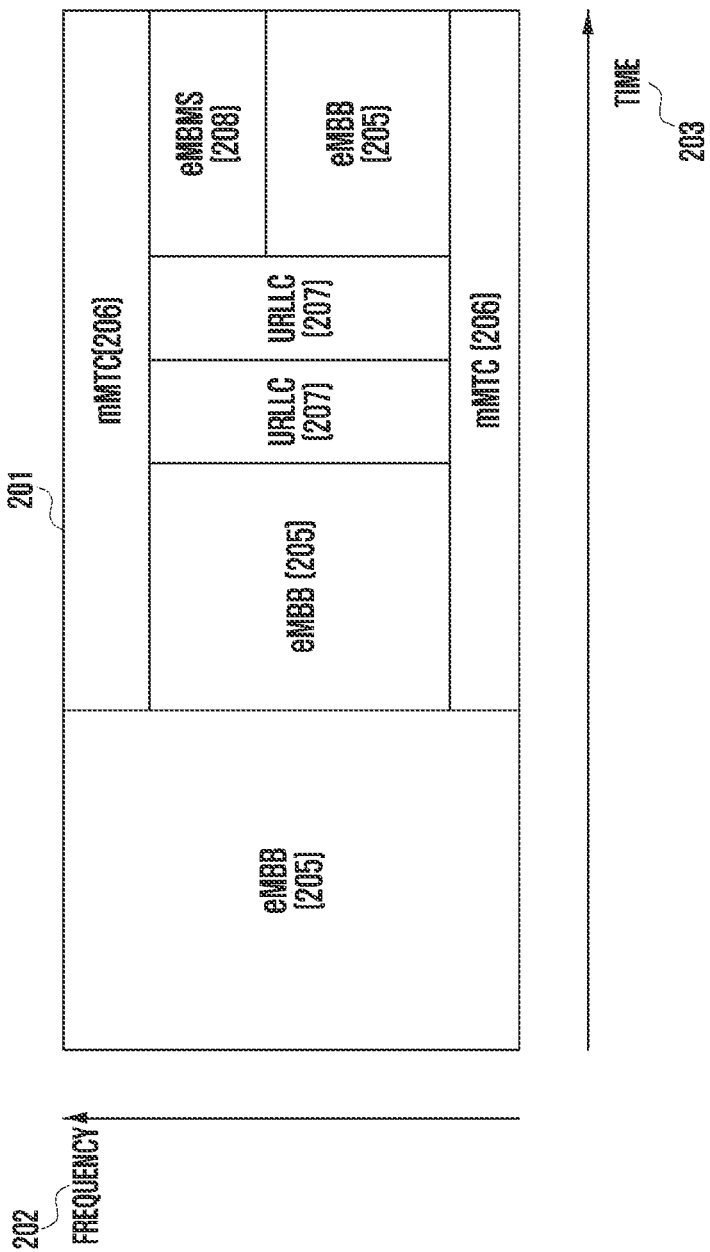
FIG. 2 is a diagram illustrating an example in which 5G services are multiplexed and transmitted in a single system.

FIG. 2 is a diagram illustrating an example in which services considered in 5G are transmitted in a single system.

In FIG. 2, frequency and time resources 201 used in 5G may be configured as a frequency domain 202 and a time domain 203. FIG. 2 shows an example in which eMBB 205, mMTC 206, and URLLC 207 are operated in a single framework. In addition, an enhanced mobile broadcast/multicast service (eMBMS) 208 for providing a broadcast service based on cellular communication may be further considered in 5G. The services considered in 5G, such as eMBB 205, mMTC 206, URLLC 207, eMBMS 208, or the like, may be multiplexed through time division multiplexing (TDM) or frequency division multiplexing (FDM) within a single system frequency bandwidth operated in 5G, and may then be transmitted. In addition, spatial division multiplexing may be considered.

In the case of eMBB 205, it is preferable to occupy a maximum frequency bandwidth for transmission at a specific time in order to provide the increased data rate described above. Therefore, it is preferable that the service of eMBB 205 be multiplexed by means of TDM along with other services within a system transmission bandwidth 201 and then be transmitted, and it is also possible to multiplex the service of eMBB 205 by means of FDM with other services within a system transmission bandwidth according to the needs of other services and to then transmit the same.

Unlike other services, mMTC 206 requires an increased transmission interval in order to secure wide coverage, and may ensure coverage by repeatedly transmitting the same packet within the transmission interval. In addition, in order to reduce the complexity and price of a terminal, the transmission bandwidth that the terminal is capable of receiving is limited. In consideration of these requirements, mMTC 206 is preferably multiplexed by means of FDM with other services within the transmission system bandwidth 201 of 5G and is then transmitted.

URLLC 207 preferably has a shorter TTI than other services in order to meet the ultra latency requirement desired by the service. In addition, since URLLC must have a low coding rate in order to satisfy the requirement of high reliability, it is desirable to have a wide bandwidth on the frequency side. In consideration of the above requirements of URLLC 207, URLLC 207 is preferably multiplexed by means of TDM with other services within the transmission system bandwidth 201 of 5G.

The respective services described above may have different transmission/reception schemes and transmission/reception parameters to satisfy the requirements desired by the services. For example, the respective services may have different numerologies depending on service requirements. The numerology includes the length of a cyclic prefix (CP), a subcarrier spacing, the length of an OFDM symbol, a transmission time interval (TTI), and the like in a communication system based on orthogonal frequency division multiplexing (OFDM) or orthogonal frequency division multiple access (OFDMA).

As an example of services having different numerologies, eMBMS 208 may have a CP length longer than those of other services. eMBMS may transmit broadcast-based higher-layer traffic, thereby transmitting the same data in all cells. In this case, if the delay of signals received by the terminal in a plurality of cells falls within a CP length, the terminal may receive and decode all of the signals, thereby obtaining a single frequency network (SFN) gain. Therefore, a terminal located at a cell boundary is also capable of receiving broadcast information without restriction of coverage. However, if the CP length is relatively greater than other services in supporting eMBMS in 5G, waste is incurred due to CP overhead. Therefore, an OFDM symbol length greater than other services is required in addition thereto, and a subcarrier interval narrower than those of other services is also required.

In addition, as an example of services having different numerologies in 5G, since URLLC requires a TTI less than other services, a shorter OFDM symbol length may be required, and a wider subcarrier interval may also be required.

Meanwhile, in 5G, one TTI may be defined as one slot, and may include 14 OFDM symbols or 7 OFDM symbols. Therefore, in the case of subcarrier spacing of 15 KHz, one slot has a length of 1 ms or 0.5 ms. In addition, in 5G, one TTI may be defined as one mini-slot or sub-slot for emergency transmission and transmission in an unlicensed band, and one mini-slot may have one OFDM symbol to (total number of OFDM symbols in slot–1) OFDM symbols. For example, if one slot has a length of 14 OFDM symbols, the length of a mini-slot may be determined to be 1 to 13 OFDM symbols. The length of the slot or mini-slot may be defined as a standard, or may be transmitted through a higher-layer signal or system information so that the terminal may receive the same. In addition, instead of the mini-slot or the sub-slot, the length of a slot may be determined to be 1 to 14 OFDM symbols, and the length of the slot may be transmitted through a higher-layer signal or system information so that the terminal may receive the same.

The slot or mini-slot may be defined to have any of various transmission formats, and may be classified into the following formats.

DL-only slot or full DL slot: A DL-only slot is configured only as a downlink interval, and supports only downlink transmission.

DL-centric slot: A DL-centric slot is configured as a downlink interval, a guard period (GP), and an uplink interval, and the number of OFDM symbols in the downlink interval is larger than the number of OFDM symbols in the uplink interval UL-centric slot: A UL-centric slot is configured as a downlink interval, a GP, and an uplink interval, and the number of OFDM symbols in the downlink interval is smaller than the number of OFDM symbols in the uplink interval UL-only slot or full UL slot: A UL-only slot is configured only as an uplink interval and supports only uplink transmission.

Although only the slot formats are classified above, the mini-slots may be classified in the same manner. That is, the mini-slots may be classified into a DL-only mini-slot, a DL-centric mini-slot, a UL-centric mini-slot, a UL-only mini-slot, and the like.

In the case where the terminal is configured to transmit the uplink control channel in a single slot, a method for applying spreading code is required to support multiplexing of a terminal depending on enablement or disablement of frequency hopping of PUCCH format 1, which is an uplink control channel format having a long transmission interval (hereinafter, referred to as a "long PUCCH") in order to realize a sufficient cell coverage, and the number of transmission symbols of PUCCH format 1.

Enablement or disablement of frequency hopping indicates whether to enable or disable hopping in a slot. In addition, the expression "no frequency hopping is configured" or "frequency hopping is disabled" indicates the case where frequency hopping is not applied. On the other hand, the expression "frequency hopping is configured" or "frequency hopping is enabled" indicates the case where frequency hopping is applied. Hereinafter, "frequency hopping" simply indicates the meaning of the frequency hopping described above, unless stated otherwise.

The disclosure provides a method in which a base station transmits a configuration for transmitting PUCCH format 1, which is a long PUCCH format, to a terminal and in which the terminal receives the configuration and transmits an uplink control channel in a slot or a mini-slot for transmission and reception of an uplink control channel between the base station and the terminal in a slot or a mini-slot. In addition, the transmission interval (or a transmission starting symbol and a transmission end symbol) of the uplink control channel may differ depending on the format of the slot or mini-slot. Further, it must be considered that an uplink control channel having a short transmission interval (short PUCCH) to minimize a transmission delay and a long PUCCH coexist in a slot or in a plurality of slots, and that the uplink control channel is multiplexed in a slot or in a plurality of slots, such as transmission of an uplink sounding signal, for example, a sounding reference signal (SRS). Therefore, the disclosure provides a method in which a base station configures enablement or disablement of frequency hopping and a spreading code index of PUCCH format 1 for a terminal depending on frequency hopping and the number of transmission symbols and in which the terminal applies the configured enablement or disablement of frequency hopping and the spreading code of the configured index to control symbols and reference signal symbols, respectively, thereby transmitting PUCCH format 1.

Hereinafter, preferred embodiments of the disclosure will be described in detail with reference to the accompanying drawings. It should be noted that the same elements are denoted by the same reference numerals in the accompanying drawings. In addition, a detailed description of well-known functions and configurations, which may obscure the subject matter of the disclosure, will be omitted.

Further, embodiments of the disclosure will be described in detail, based on LTE and 5G systems. However, it will be understood by those skilled in the art that the primary subject matter of the disclosure is able to be applied to other communication systems having similar technical backgrounds and channel forms by slightly modifying the disclosure without departing from the scope of the disclosure.

Hereinafter, a 5G system for transmitting and receiving data in the 5G cell will be described.

Figure 3A:
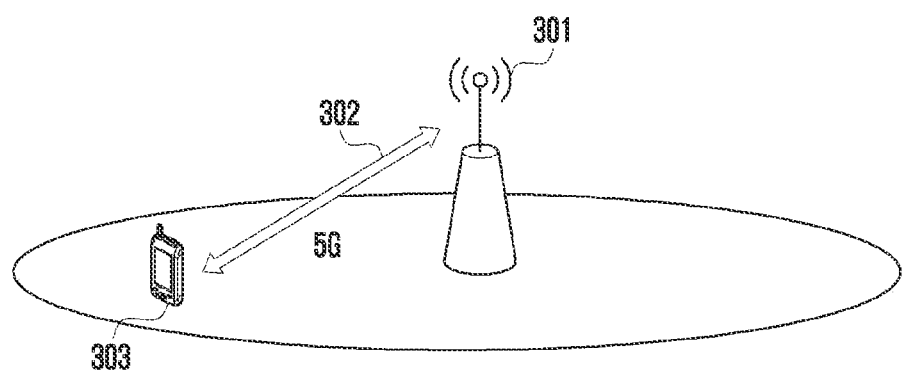
FIG. 3A is a diagram illustrating an embodiment of a communication system to which the disclosure is applied.
Figure 3B:
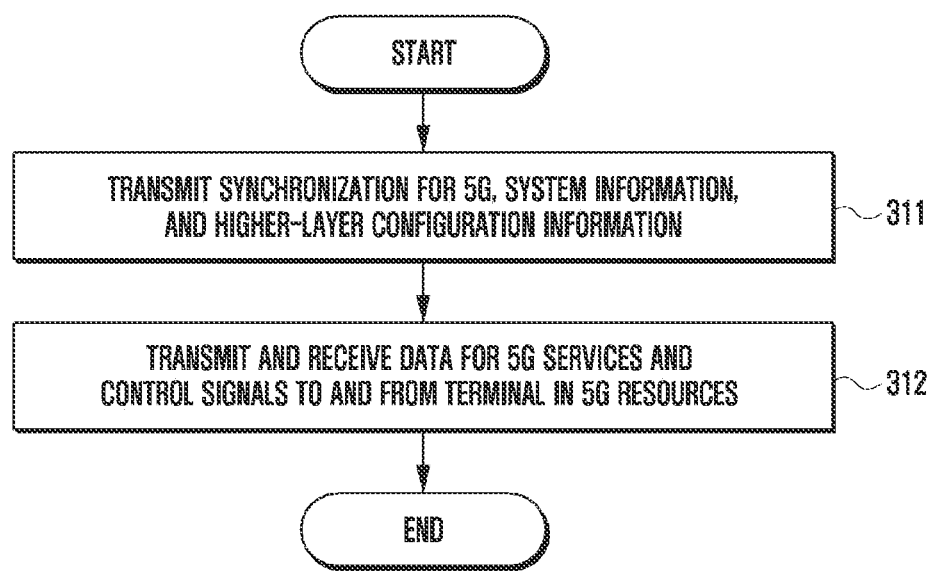
FIG. 3B is a diagram illustrating the operation of a base station in a communication system to which the disclosure is applied.
Figure 3C:
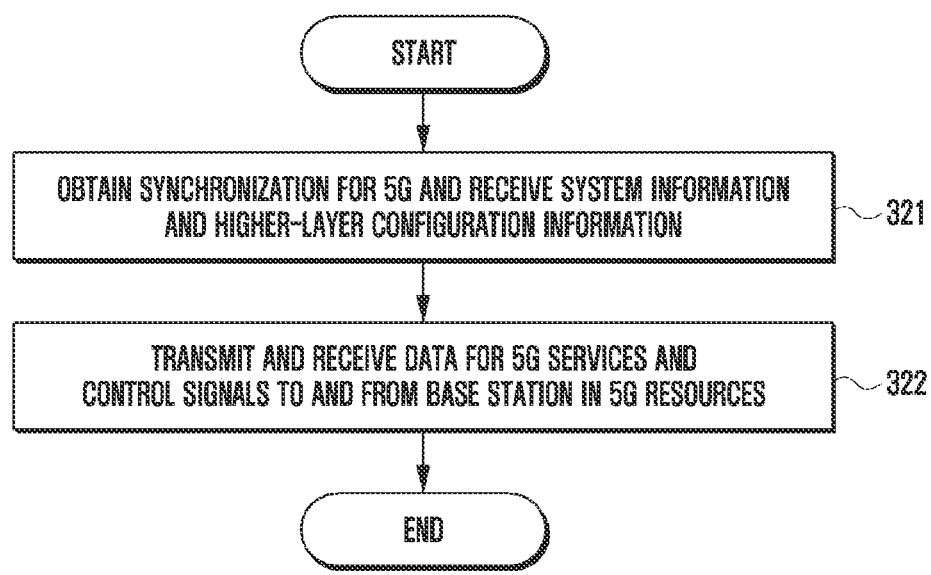
FIG. 3C is a diagram illustrating the operation of a terminal in a communication system to which the disclosure is applied.

FIGS. 3A, 3B, and 3C are diagrams illustrating an embodiment of a communication system to which the disclosure is applied. The diagrams show a structure in which a 5G system is operated, and the methods proposed by the disclosure may be applied to the system shown in FIG. 3A.

Referring to FIG. 3A, FIG. 3A illustrates the case in which a 5G cell 302 is operated for a single base station 301 in a network. A terminal 303 is a 5G-capable terminal having a 5G transceiver module. The terminal 303 obtains synchronization through a synchronization signal transmitted from the 5G cell 302, receives system information, and then transmits/receives data to/from the base station 301 through the 5G cell 302. In this case, there is no limitation as to the duplex scheme of the 5G cell 302 {that is, both FDD and time division duplex (TDD) are able to be supported}. Transmission of uplink control information is performed through the 5G cell 302 in the case where the 5G cell is a P cell. In the system shown in FIG. 5A, the 5G cell may include a plurality of serving cells, and may support a total of 32 serving cells. It is assumed that the base station 301 is equipped with a 5G transmission/reception module (system) in the network, and the base station 301 may manage and operate the 5G system in real time.

Next, a procedure in which the base station 301 configures 5G resources and transmits and receives data to and from the 5G-capable terminal 303 using the 5G resources will be described.

FIG. 3B is a diagram illustrating the operation of a base station. In step 311, the base station 301 transmits, to the 5G-capable terminal 303, synchronization signals for 5G, system information, and higher-layer configuration information. The synchronization signals for 5G may be separate synchronization signals for eMBB, mMTC, and URLLC using different numerologies, or the synchronization signal for 5G may be a common synchronization signal in a specific 5G resource using a single numerology. The system information may be common system information in a specific 5G resource using a single numerology, or may be separate system information for eMBB, mMTC, and URLLC using different numerologies. The system information and the higher-layer configuration information may include configuration information on whether data is transmitted and received based on a slot or a mini-slot, and may include the number of OFDM symbols of a slot or a mini-slot and numerologies thereof.

In addition, in the case where reception of a downlink common control channel is configured for the terminal, the system information and the higher-layer configuration information may include configuration information related to the reception of a downlink common control channel. In addition, the system information and the higher-layer configuration information may include information necessary in order for the terminal to transmit an uplink control channel. For example, the system information and the higher-layer configuration information may include at least one piece of frequency hopping configuration information, spreading code index information for applying spreading code in the time domain, transmission starting symbol information, transmission length information, transmission starting PRB information in the frequency domain, information on the number of PRBs, frequency resource information in a second hop when frequency hopping is enabled, and the like.

In step 312, the base station 301 transmits and receives data for 5G services and control signals thereof to and from the 5G-capable terminal 303 in 5G resources. The control signal includes an uplink control channel including PUCCH format 1, and the base station 301 receives PUCCH format 1 based on the configuration information on the uplink control channel configured for the terminal in step 311.

Next, a procedure in which the 5G-capable terminal 303 is allocated with 5G resources by the base station 301 and transmits and receives data in 5G resources will be described.

FIG. 3C is a diagram illustrating the operation of a terminal.

In step 321, the 5G-capable terminal 303 obtains synchronization from the synchronization signal for 5G transmitted from the base station 301, and receives system information and higher-layer configuration information transmitted from the base station 301. The synchronization signals for 5G may be separate synchronization signals for eMBB, mMTC, and URLLC using different numerologies, or the synchronization signal for 5G may be a common synchronization signal in a specific 5G resource using a single numerology. The system information may be common system information in a specific 5G resource using a single numerology, or may be separate system information for eMBB, mMTC, and URLLC using different numerologies. The system information and the higher-layer configuration information may include configuration information on whether data is transmitted/received based on a slot or a mini-slot, and may include the number of OFDM symbols of a slot or a mini-slot and numerologies thereof.

In addition, in the case where reception of a downlink common control channel is configured for the terminal, the system information and the higher-layer configuration information may include configuration information related to the reception of a downlink common control channel. Further, the system information and the higher-layer configuration information may include information necessary in order for the terminal to transmit an uplink control channel. For example, the system information and the higher-layer configuration information may include at least one piece of frequency hopping configuration information, spreading code index information for applying spreading code in the time domain, transmission starting symbol information, transmission length information, transmission starting PRB information in the frequency domain, information on the number of PRBs, frequency resource information in a second hop when frequency hopping is enabled, and the like.

In step 322, the 5G-capable terminal 303 transmits/receives data and control signals for 5G services to/from the base station 301 in 5G resources. The control signal includes an uplink control channel including PUCCH format 1, and the terminal 303 transmits PUCCH format 1 based on configuration information on the uplink control channel received from the base station in step 321.

Next, a method in which a terminal, configured or instructed to transmit a long PUCCH, applies frequency hopping to a long PUCCH in order to improve performance using frequency diversity, when uplink control channels, such as a long PUCCH, a short PUCCH, and an SRS, coexist in one TTI or one slot in the case where the 5G system in FIG. 3 is operated based on a slot or a mini-slot, will be provided, and a method of applying spreading code for multiplexing a plurality of terminals to a long PUCCH, based on the frequency hopping method with respect to the long PUCCH, will be described.

Figure 4:
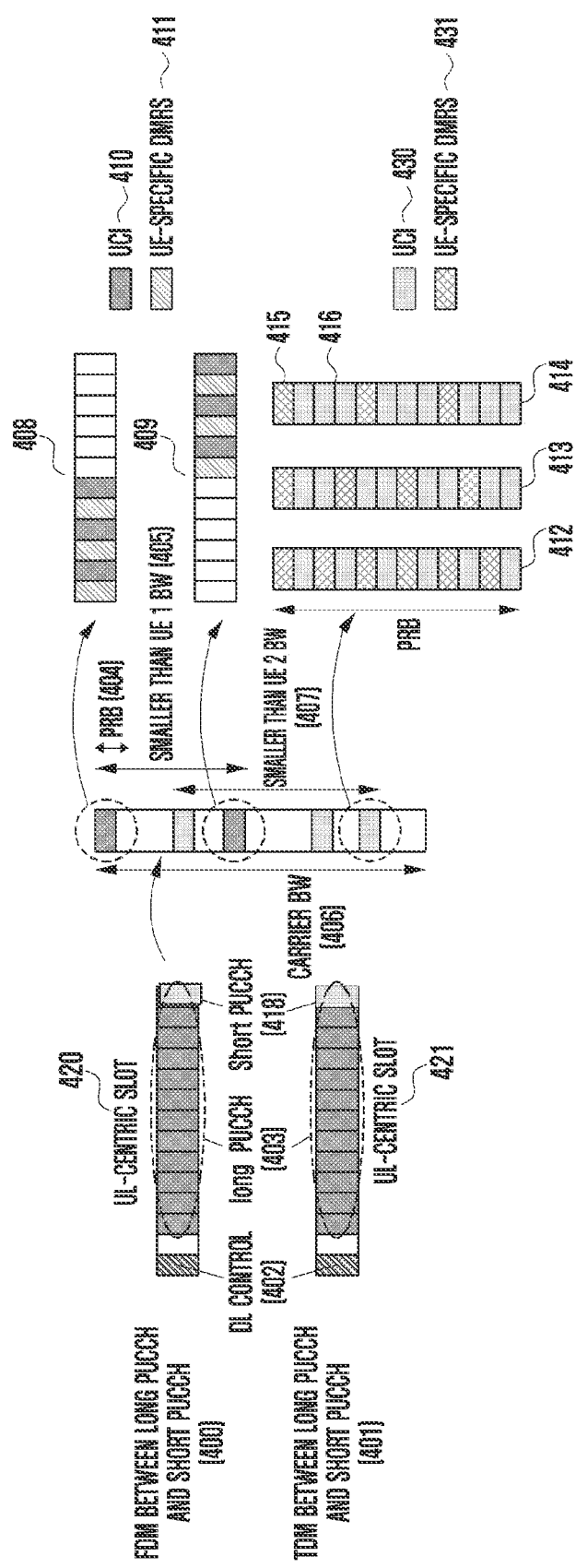
FIG. 4 is a diagram illustrating the structure of an uplink control channel in the disclosure.

First, FIG. 4 is a diagram illustrating the structure of an uplink control channel in the disclosure.

Although a method in which a terminal transmits an uplink control channel by determining a transmission interval (or a starting symbol and an end symbol) of a long PUCCH, based on a slot, will be described with reference to FIG. 4, the method may be applied to the case where a terminal transmits an uplink control channel by determining the transmission interval (or a starting symbol and an end symbol) of a long PUCCH, based on a mini-slot.

FIG. 4 shows that a long PUCCH and a short PUCCH are multiplexed in the frequency domain (FDM) 400 or multiplexed in the time domain (TDM) 401. First, a slot structure in which the long PUCCH and the short PUCCH are multiplexed will be described with reference to FIG. 4. Reference numerals 420 and 421 denote UL-centric slots in a slot as a basic transmission unit of 5G (the slot may be referred to using various names, such as "subframe", "TTI", or the like, and the basic transmission unit will be referred to as a "slot" in the disclosure). In the UL-centric slot, most OFDM symbols are used for uplink transmission, all OFDM symbols may be used for uplink transmission, or several of the first and last OFDM symbols may be used for downlink transmission. In addition, when a downlink interval and an uplink interval coexist in one slot, there may be a transmission gap therebetween.

In FIG. 4, a first OFDM symbol is used for downlink transmission, for example, downlink control channel transmission 402, and a third OFDM symbol and OFDM symbols subsequent thereto are used for uplink transmission in one slot. A second OFDM symbol is utilized as a transmission gap. Uplink data channel transmission and uplink control channel transmission are possible in the uplink interval.

Next, the long PUCCH 403 will be described. Since a control channel having a long transmission interval is used for the purpose of increasing cell coverage, the control channel may be transmitted by a discrete Fourier transform-spread-OFDM (DFT-S-OFDM) scheme, which is a form of single carrier transmission, instead of OFDM transmission. Therefore, in this case, the PUCCH must be transmitted using only consecutive subcarriers, and frequency hopping may be configured to obtain a frequency diversity effect. That is, in the case where frequency hopping is applied (when frequency hopping is enabled through a higher-layer signal), the terminal may configure an uplink control channel having a long transmission interval, based on the resources spaced apart from each other as denoted by reference numerals 408 and 409. In the case where frequency hopping is not applied (when frequency hopping is disabled through a higher-layer signal), the long PUCCH may be transmitted at the frequency position of 408 (that is, at the position determined by transmission starting PRB information and information on the number of PRBs configured in a higher-layer signal) during the transmission symbol interval of the long PUCCH.

The distance 405 in frequency must be less than the bandwidth supported by the terminal, and the long PUCCH may be transmitted using PRB-1 at the front of the slot as shown in 408, and may be transmitted using PRB-2 at the back of the slot as shown in 409. The PRB is a physical resource block, which is a minimum transmission unit on the frequency side, and may be defined as 12 subcarriers or the like. Therefore, the frequency distance between PRB-1 and PRB-2 must be less than the maximum bandwidth supported by the terminal, and the maximum bandwidth supported by the terminal may be less than or equal to the bandwidth 406 supported by the system. In addition, the control channel transmitted at the front of the slot in 408 and the control channel transmitted at the back of the slot in 409 include uplink control information (UCI) 410 and UE reference signals 411, respectively, and it is assumed that the two signals are separated from each other in time and are transmitted in different OFDM symbols.

The long PUCCH supports transmission formats such as PUCCH format 1, PUCCH format 3, and PUCCH format 4 depending on the number of bits of supportable control information and depending on whether or not multiplexing of a terminal is supported through support for pre-DFT orthogonal cover code (OCC) at the front of IFFT.

First, PUCCH format 1 is a DFT-S-OFDM-based long PUCCH format capable of supporting up to 2 bits of control information. The control information may include HARQ-ACK, a scheduling request (SR), or a combination thereof. PUCCH format 1 includes an OFDM symbol including a DMRS, which is a demodulation reference signal, and an OFDM symbol including uplink control information (UCI), which alternate with each other. For example, in the case where PUCCH format 1 has 8 transmission symbols, the PUCCH includes a DMRS symbol, a UCI symbol, a DMRS symbol, a UCI symbol, a DMRS symbol, a UCI symbol, a DMRS symbol, and a UCI symbol, in sequence from the first starting symbol of the 8 symbols.

The DMRS symbol spreads a sequence corresponding to a length of 1 RB in the frequency domain over the time domain using an orthogonal code {or an orthogonal sequence or spreading, $w_i(m)$} in a single OFDM symbol, and is then transmitted after performing IFFT. The UCI symbol generates d(0) through BPSK-modulation for 1 bit of control information and QPSK-modulation for 2 bits of control information, scrambles the generated d(0) by multiplying the same by a sequence corresponding to a length of 1 RB on the frequency domain, spreads the scrambled sequence along the time domain using an orthogonal code {or an orthogonal sequence or spreading code, $w_i(m)$}, and is then transmitted after performing IFFT. The terminal generates a sequence, based on group hopping configuration or sequence hopping configuration configured by means of a higher-layer signal from the base station and a configured ID, and cyclically shifts the generated sequence using an initial cyclic shift (CS) value configured by a higher-layer signal, thereby generating a sequence corresponding to the length of 1 RB.

$w_i(m)$ is given as shown in Table 2 depending on the length ($N_{SF}$) of spreading code. $w_i(m)$ is defined as $w_i(m)=e^{j2\varphi(m)/N_{SF}}$. "i" denotes the index of spreading code, and "m" denotes the indexes of elements of the spreading code. Here, the numbers in [ ] in Table 2 indicate $\varphi(m)$, and for example, in the case where the spreading code has a length of 2, the index of spreading code is i=0, and the spreading code $w_i(m)$ has values $w_i(0)=e^{j2\pi*0/N_{SF}}=1$ and $w_i(1)=e^{j2\pi*0/N_{SF}}=1$, thereby obtaining $w_i(m)=[1\ 1]$.

Next, PUCCH format 3 is a DFT-S-OFDM-based long PUCCH format capable of supporting 2 bits or more of control information. The control information may include HARQ-ACK, channel state information (CSI) (or channel information), SR or a combination thereof. The positions of DMRS symbols in PUCCH format 3 are shown in Table 3 below depending on enablement or disablement of frequency hopping and whether or not additional DMRS symbols are configured.

TABLE 3

| | DMRS positions in transmission of PUCCH format ¾ | | | |
|---|---|---|---|---|
| | No additional DMRS is configured | | Additional DMRS is configured | |
| Transmission length of PUCCH format ¾ | No frequency hopping is configured | Frequency hopping is configured | No frequency hopping is configured | Frequency hopping is configured |
| 4 | 1 | 0, 2 | 1 | 0, 2 |
| 5 | | 0, 3 | | 0, 3 |
| 6 | | 1, 4 | | 1, 4 |
| 7 | | 1, 4 | | 1, 4 |
| 8 | | 1, 5 | | 1, 5 |
| 9 | | 1, 6 | | 1, 6 |
| 10 | | 2, 7 | | 1, 3, 6, 8 |
| 11 | | 2, 7 | | 1, 3, 6, 9 |
| 12 | | 2, 8 | | 1, 4, 7, 10 |
| 13 | | 2, 9 | | 1, 4, 7, 11 |
| 14 | | 3, 10 | | 1, 5, 8, 12 |

For example, if PUCCH format 3 has 8 transmission symbols, the first starting symbol of the 8 symbols starts with 0, and DMRSs are transmitted in the first symbol and the fifth symbol. The above table is also applied to the DMRS symbol positions in PUCCH format 4.

Next, PUCCH format 4 is a DFT-S-OFDM-based long PUCCH format capable of supporting 2 bits or more of control information. The control information may include HARQ-ACK, CSI, SR, or a combination thereof. PUCCH format 4 is different from PUCCH format 3 in that PUCCH format 4 of multiple terminals can be multiplexed in a single RB in the case of PUCCH format 4. It is possible to multiplex PUCCH format 4 of multiple terminals by applying pre-DFT OCC to control information prior to IFFT. However, the number of control information symbols capable of being transmitted by a terminal is reduced depending on the number of terminals to be multiplexed.

Next, a short PUCCH 418 will be described. The short PUCCH may be transmitted both in a DL-centric slot and in a UL-centric slot, and, in general, may be transmitted in the last symbol of the slot or in the OFDM symbol at the back of the slot (e.g., the last OFDM symbol, the second to last OFDM symbol, or the last two OFDM symbols). Alterna-

TABLE 2

| | $\varphi(m)$ | | | | | | |
|---|---|---|---|---|---|---|---|
| $N_{SF}$ | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] | tively, the short PUCCH may be transmitted at any position within the slot. In addition, the short PUCCH may be transmitted using one OFDM symbol or two OFDM symbols. In FIG. 4, the short PUCCH is transmitted in the last symbol 418 of the slot. Radio resources for the short PUCCH are allocated in units of PRBs on the frequency side. One PRB or a plurality of consecutive PRBs may be allocated, or a plurality of PRBs spaced apart from each other in the frequency bands may be allocated. In addition, the allocated PRBs must be included in a band equal to or smaller than the frequency band 407 supported by the terminal.

In addition, the uplink control information 430 and the demodulation reference signal 431 are multiplexed in a frequency band in a single PRB. There may be a method of transmitting a demodulation reference signal in one subcarrier for every two symbols as indicated by 412, a method of transmitting a demodulation reference signal in one subcarrier for every three symbols as indicated by 413, or a method of transmitting a demodulation reference signal in one subcarrier for every three symbols as indicated by 414.

The method to be used may be selected from among the methods of transmitting a demodulation reference signal such as 412, 413, and 414 by a higher-layer signal. Alternatively, one of the mapping schemes may be defined in the standard so that the terminal transmits a short PUCCH according to the mapping scheme, and the base station demodulates the short PUCCH according to the mapping scheme. Alternatively, the terminal multiplexes and transmits a demodulation reference signal and uplink control information according to the method indicated through reception of a higher-layer signal. Alternatively, the method of transmitting a demodulation reference signal may be determined according to the number of bits of the uplink control information 420. For example, if uplink control information has a small number of bits, the terminal may transmit a PUCCH using a method of multiplexing a demodulation reference signal and uplink control information, as indicated by 412. If the uplink control information has a small number of bits, it is possible to obtain a sufficient transmission code rate even if a large amount of resources is not used for transmission of uplink control information. For example, if uplink control information has a large number of bits, the terminal may perform transmission through multiplexing of a demodulation reference signal and uplink control information as indicated by 414. If uplink control information has a large number of bits, it is required to use a large number of resources for transmission of uplink control information in order to lower the transmission code rate.

The short PUCCH supports transmission formats, such as PUCCH format 0 and PUCCH format 2, according to the number of bits of supportable control information. First, PUCCH format 0 is a short PUCCH format based on CP-OFDM capable of supporting up to 2 bits of control information. The control information may include HARQ-ACK, SR, or a combination thereof. According to PUCCH format 0, only a sequence mapped to 12 subcarriers on the frequency domain is transmitted in a single OFDM symbol, instead of transmitting the DMRS. The terminal generates a sequence, based on group hopping or sequence hopping configuration configured by means of a higher-layer signal from the base station and a configured ID, and cyclically shifts the generated sequence using a final CS value obtained by adding different CS values to an indicated initial CS value depending on ACK or NACK, thereby transmitting the sequence while mapping the same to 12 subcarriers. For example, if HARQ-ACK has 1 bit, the final CS is generated by adding 6 to an initial CS value for ACK, and the final CS is generated by adding 0 to an initial CS for NACK, as shown in Table 4 below. The CS value 0 for NACK and the CS value 6 for ACK are defined in standards, and the terminal always generates PUCCH format 0 according to the above values and transmits 1-bit HARQ-ACK.

TABLE 4

| 1-bit HARQ-ACK | NACK | ACK |
| --- | --- | --- |
| Final CS | (initial CS + 0) mod 12 = initial CS | (initial CS + 6) mod 12 |

For example, if HARQ-ACK has 2 bits, as shown in Table 5, 0 is added to an initial CS value for (NACK, NACK), 3 is added to an initial CS value for (NACK, ACK), 6 is added to an initial CS value for (ACK, ACK), and 9 is added to an initial CS value for (ACK, NACK). The CS value 0 for (NACK, NACK), the CS value 3 for (NACK, ACK), the CS value 6 for (ACK, ACK), and the CS value 9 for (ACK, NACK) are defined in the standard, and the terminal always generates PUCCH format 0 according to the above values and transmits a 2-bit HARQ-ACK.

If the final CS value exceeds 12 as a result of adding the CS values to an initial CS value according to ACK or NACK, it is obvious to apply modulo 12 thereto because the sequence has a length of 12.

TABLE 5

| 2-bit HARQ-ACK | NACK, NACK | NACK, ACK | ACK, ACK | ACK, NACK |
| --- | --- | --- | --- | --- |
| Final CS | (initial CS + 0) mod 12 = initial CS | (initial CS + 3) mod 12 | (initial CS + 6) mod 12 | (initial CS + 9) mod 12 |

Next, PUCCH format 2 is a CP-OFDM-based short PUCCH format capable of supporting control information of 2 bits or more. The control information may include HARQ-ACK, CSI, SR, or a combination thereof. In PUCCH format 2, the subcarriers transmitting DMRSs in one OFDM symbol are fixed to the positions of subcarriers having indexes #1, #4, #7, and #10, provided that the first subcarrier has an index #0 as denoted by 414 in FIG. 4. The control information is mapped to the remaining subcarriers, excluding the subcarriers in which the DMRSs are located, after a channel encoding and modulation process. The method in which the terminal selects one of the short PUCCH format and the long PUCCH format and transmits control information will be described below.

The terminal receives a configuration of PUCCH resource sets through a higher-layer signal. The terminal selects the configured PUCCH resource sets according to the number of bits of control information. In a specific slot, the terminal selects PUCCH resource set 0 if the number of bits of control information to be transmitted is 1 to 2, selects PUCCH resource set 1 if the number of bits of control information to be transmitted is 3 to $N_2-1$, selects PUCCH resource set 2 if the number of bits of control information to be transmitted is $N_2$ to $N_3-1$, and selects PUCCH resource set 3 if the number of bits of control information to be transmitted is $N_3$ to $N_4-1$. The terminal may receive $N_2$, $N_3$, and $N_4$ in advance from the base station through higher-layer signals.

Each PUCCH resource set includes X PUCCH resources, and the X PUCCH resources include resources for short PUCCHs (PUCCH format 0 and PUCCH format 2) or resources for long PUCCHs (PUCCH format 1, PUCCH format 3, and PUCCH format 4). That is, each of the configured PUCCH resources may include all information necessary for transmission of a PUCCH according to a specific PUCCH format (PUCCH format 0, PUCCH format 1, PUCCH format 2, PUCCH format 3, or PUCCH format 4), and the respective PUCCH resources may be configured to transmit different PUCCH formats. "X" is a constant, and "X" may be configured differently for the respective PUCCH resource sets through higher-layer signals. That is, it may be X=32 for PUCCH resource set 0, and it may be X=8 for the remaining PUCCH resource sets 1, 2, and 3.

The resource selected by the terminal from among X resources and whether or not a PUCCH format corresponding to the selected resource is to be transmitted may be indicated through the bits of the downlink control information, or may be deduced from a transmission resource of the downlink control channel, a slot index, an identifier (ID) of the terminal, or the like. Alternatively, the resource selected by the terminal and whether or not a PUCCH format is to be transmitted may be indicated to the terminal through a combination of indication by means of the downlink control information and induction from a transmission resource of the downlink control channel, a slot index, an ID of the terminal, or the like.

As described above, the terminal receives or deduces the indication method, selects one PUCCH resource from the X PUCCH resources, and transmits control information through a corresponding PUCCH format. The above PUCCH resource indication method may be applied only when it is possible for the terminal to determine the PUCCH resource through reception of a corresponding downlink control channel before transmission of HARQ-ACK, such as HARQ-ACK transmission. On the other hand, in the case where the terminal does not receive a corresponding downlink control channel before CSI or SR, such as CSI or SR transmission, the terminal may receive, from the base station, the PUCCH format to be used in transmission of CSI or SR and a PUCCH resource required therefor in advance through a higher-layer signal. The terminal transmits CSI or SR through the configured PUCCH resource using the configured PUCCH format in the slot for transmission of CSI or SR according to the period and offset configured by a higher-layer signal from the base station.

Each PUCCH resource corresponding to the PUCCH format includes at least one piece of the following information.

- PUCCH transmission starting symbol and the number of PUCCH transmission symbols
- An index indicating a starting PRB, the number of transmission PRBs, whether or not frequency hopping is configured, and the frequency resource in a second hop when frequency hopping is indicated
- An initial CS value, an index of time-domain OCC, the length of pre-DFT OCC, and an index of pre-DFT OCC Necessary information and the ranges of values according to the respective PUCCH formats may be shown in Table 6 below. In Table 6, the case in which a value does not need to be configured or the case in which the range of a value is not required because the value is equal to 1 will be expressed as "N.A.".

TABLE 6

|  |  | PUCCH format 0 | PUCCH format 1 | PUCCH format 2 | PUCCH format 3 | PUCCH format 4 |
| --- | --- | --- | --- | --- | --- | --- |
| Starting symbol | Configurability | o | o | o | o | o |
| | Value range | 0-13 | 0-10 | 0-13 | 0-10 | 0-10 |
| Number of symbols in slot | Configurability | o | o | o | o | o |
| | Value range | 1, 2 | 4-14 | 1, 2 | 4-14 | 4-14 |
| Index for identifying starting PRB | Configurability | o | o | o | o | o |
| | Value range | 0-274 | 0-274 | 0-274 | 0-274 | 0-274 |
| Number of PRBs | Configurability | N.A. | N.A. | o | o | N.A. |
| | Value range | N.A (Default is 1) | N.A. (Default is 1) | 1-16 | 1-6, 8-10, 12, 15, 16 | N.A. (Default is 1) |
| Enablement of frequency hopping | Configurability | o | o | o | o | o |
| | Value range | On/Of (only for 2 symbol) | On/Off | On/Off (only for 2 symbol) | On/Off | On/Off |
| Frequency resource in $2^{nd}$ hop if frequency hopping is enabled | Configurability | o | o | o | o | o |
| | Value range | 0-274 | 0-274 | 0-274 | 0-274 | 0-274 |
| Index of initial cyclic shift | Configurability | o | o | N.A. | N.A. | N.A. |
| | Value range | 0-11 | 0-11 | N.A. | N.A. | N.A. |
| Index of time-domain OCC | Configurability | N.A. | o | N.A. | N.A. | N.A. |
| | Value range | N.A. | 0-6 | N.A. | N.A. | N.A. |
| Length of pre-DFT OCC | Configurability | N.A. | N.A. | N.A. | N.A. | o |
| | Value range | N.A. | N.A. | N.A. | N.A. | 2, 4 |
| Index of pre-DFT OCC | Configurability | N.A. | N.A. | N.A. | N.A. | o |
| | Value range | N.A. | N.A. | N.A. | N.A. | 0, 1, 2, 3 |

Hereinafter, in the disclosure, the short PUCCH indicates PUCCH format 0 or PUCCH format 2 unless otherwise specified, and the long PUCCH indicates PUCCH format 1, PUCCH format 3, or PUCCH format 4 unless otherwise specified. In addition, in the disclosure, transmission using PUCCH format X indicates transmission of a specific PUCCH format corresponding to a PUCCH resource using the PUCCH resource obtained through the method of the disclosure, which is indicated by the base station or deduced therefrom, unless otherwise specified.

Next, the multiplexing of a long PUCCH and a short PUCCH, which has been mentioned above, will be described. In a slot 420, long PUCCHs and short PUCCHs of different terminals may be multiplexed in the frequency domain (400). In this case, the base station may configure frequency resources of the short PUCCHs and the long PUCCHs of different terminals so as not to overlap each other as shown in the PRBs in FIG. 4. However, configuring different transmission resources of uplink control channels for all terminals, regardless of scheduling, is not desirable because it may waste frequency, considering that the limited frequency resources are required to be used for transmission of an uplink data channel rather than transmission of an uplink control channel.

Therefore, the frequency resources of the short PUCCHs and the long PUCCHs of different terminals may overlap each other, and the base station must operate such that the scheduling and transmission resources of different terminals do not collide in one slot. However, if it is inevitable for the short PUCCH transmission resource and the long PUCCH transmission resource of different terminals to collide in a specific slot, the base station requires a method for preventing the long PUCCH transmission resource from colliding with the short PUCCH transmission resource, and the terminal is required to adjust the long PUCCH transmission resource according to the indication of the base station. According to the above method, the transmission resources of the short PUCCH and the long PUCCH may be multiplexed in the time domain in one slot 421 (401).

Next, a method in which an index of spreading code is determined according to the transmission length of PUCCH format 1 and is configured for a terminal and in which the terminal transmits PUCCH format 1 by applying the configured index of spreading code when frequency hopping is disabled or enabled for PUCCH format 1 that transmits, in particular, one or two bits of uplink control information for transmission of a long PUCCH in various symbols will be described with reference to FIGS. 5 and 6.

First, conditions for applying frequency hopping will be described. Frequency hopping serves to transmit uplink control information and reference signals at different frequencies in order to obtain frequency diversity. If the channel estimation gain obtained by transmitting uplink control information and reference signals at the same frequency is greater than the performance gain obtained through frequency diversity, it is preferable to transmit uplink control information and reference signals at the same frequency. Accordingly, the base station may configure whether to enable or disable frequency hopping using a higher-layer signal, and the terminal receiving the higher-layer signal may determine whether or not to apply frequency hopping when transmitting PUCCH format 1.

When frequency hopping is not applied, the frequency resource is configured as a PUCCH resource through a higher-layer signal. When frequency hopping is applied, the frequency resource before hopping (a first hop) is configured as a PUCCH resource through a higher-layer signal, and the frequency resource after hopping (a second hop) is also configured as a PUCCH resource. In the case where frequency hopping is applied or is not applied by the reception of the above signals, the terminal may transmit PUCCH format 1 at a frequency before hopping and at a frequency after hopping. In addition, the spreading code ($w_i(m)$) applied in FIGS. 5 and 6 may be a sequence including the integers 1 and −1, or may be a sequence including complex numbers.

Figure 5:
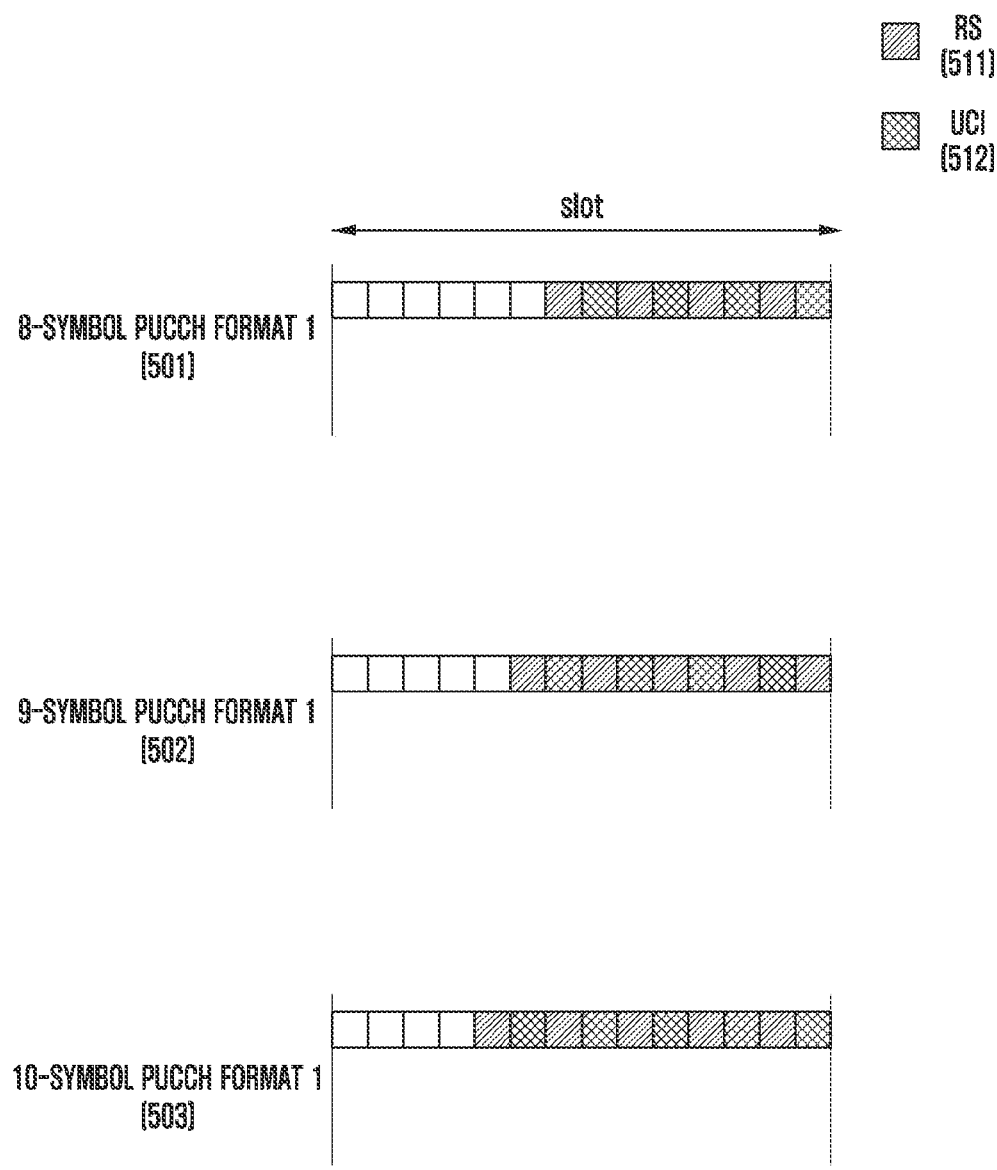
FIG. 5 is a diagram illustrating the case in which frequency hopping is disabled in a slot depending on the number of transmission symbols of PUCCH format 1 in the disclosure.

FIG. 5 is a diagram illustrating an example in which frequency hopping is disabled depending on the number of transmission symbols of PUCCH format 1 in a slot in the disclosure. Although it will be described in the embodiment that PUCCH format 1 transmission symbols are mapped in the sequence of a symbol for transmitting a reference signal and a symbol for transmitting uplink control information, the disclosure may be applied to the case in which PUCCH format 1 transmission symbols are mapped in the sequence of a symbol for transmitting uplink control information and a symbol for transmitting a reference signal.

Although FIG. 5 illustrates only 8-symbol PUCCH format 1 (501), 9-symbol PUCCH format 1 (502), and 10-symbol PUCCH format 1 (503), the disclosure may be applied to PUCCH format 1 having any of lengths of 4 symbols to 14 symbols, and PUCCH format 1 may have any of various starting symbols as well as the starting symbol shown in the drawing.

PUCCH format 1 symbols in the 8-symbol PUCCH format 1 (501) are configured in the sequence of a reference signal 511, uplink control information 512, a reference signal 511, uplink control information 512, a reference signal 511, uplink control information 512, a reference signal 511, and uplink control information 512. PUCCH format 1 symbols in the 9-symbol PUCCH format 1 (502) are configured in the sequence of a reference signal 511, uplink control information 512, a reference signal 511, uplink control information 512, a reference signal 511, uplink control information 512, a reference signal 511, uplink control information 512, and a reference signal 511. PUCCH format 1 symbols in the 10-symbol PUCCH format 1 (603) are configured in the sequence of a reference signal 511, uplink control information 512, a reference signal 511, uplink control information 512, a reference signal 511, uplink control information 512, a reference signal 511, uplink control information 512, a reference signal 511, and uplink control information 512.

In PUCCH format 1 (501, 502, or 503) including reference signal symbols and uplink control information symbols as described above, spreading code is independently applied to reference signal symbols and uplink control information symbols. Since spreading code is independently applied to the symbols for transmitting a reference signal and the symbols for transmitting uplink control information symbols, the terminal must receive spreading code indexes applied to the symbols for transmitting a reference signal and the symbols for transmitting uplink control information, respectively. In order to reduce the payload for transmitting a total of two spreading code indexes described above, the terminal may receive one spreading code index through a higher-layer signal indicating a PUCCH resource, and may independently apply the one spreading code index to the symbols transmitting reference signals and the symbols transmitting uplink control information, thereby transmitting PUCCH format 1.

Figure 6:
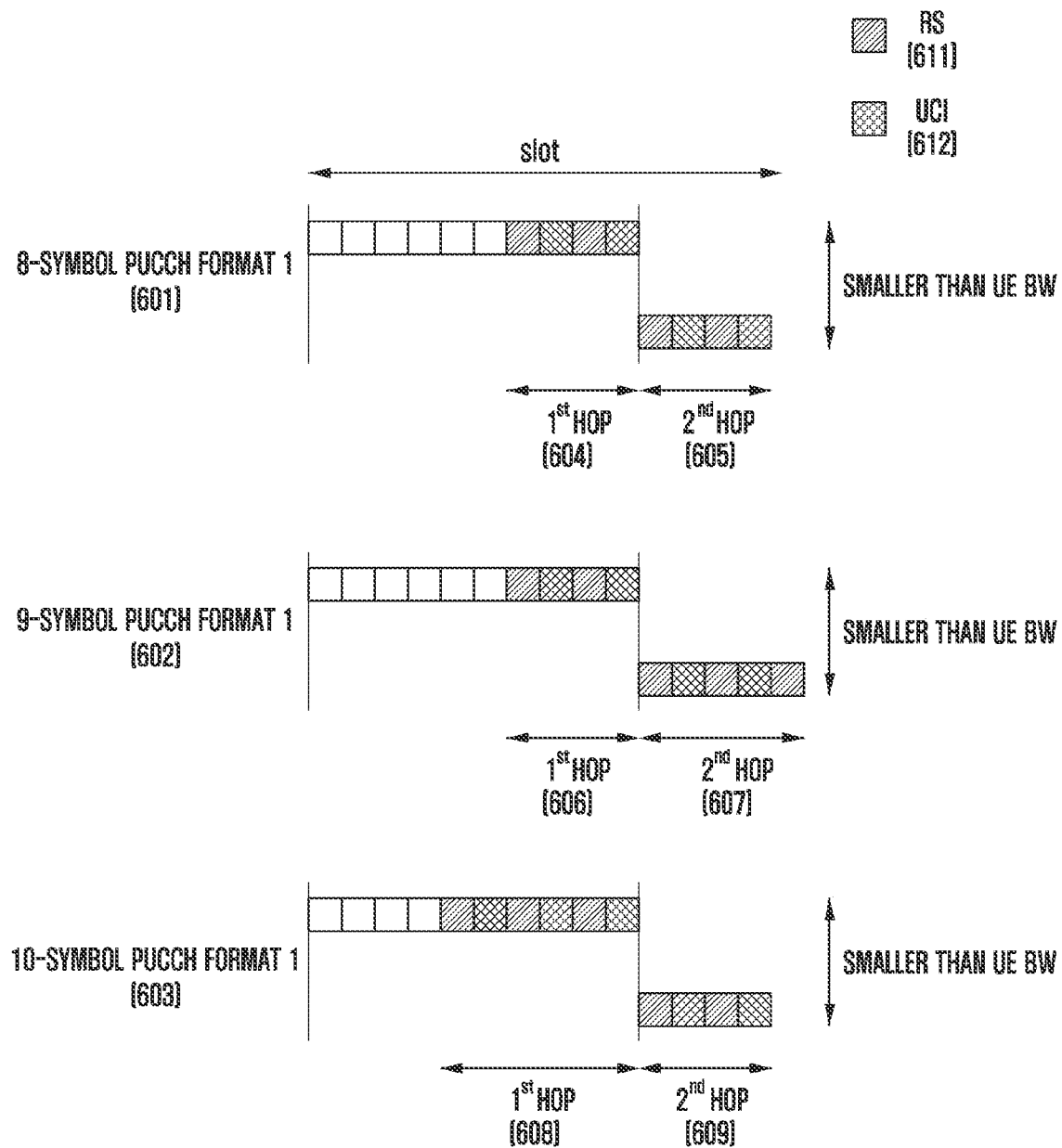
FIG. 6 is a diagram illustrating the case in which frequency hopping is enabled in a slot depending on the number of transmission symbols of PUCCH format 1 in the disclosure.

FIG. 6 is a diagram illustrating an example in which frequency hopping is enabled depending on the number of transmission symbols of PUCCH format 1 in a slot in the disclosure. Although it will be described in the embodiment that PUCCH format 1 transmission symbols are mapped in the sequence of a symbol for transmitting a reference signal and a symbol for transmitting uplink control information, the disclosure may be applied to the case in which the PUCCH format 1 transmission symbols are mapped in the order of a symbol for transmitting uplink control information and a symbol for transmitting a reference signal.

Although FIG. 6 illustrates only 8-symbol PUCCH format 1 (601), 9-symbol PUCCH format 1 (602), and 10-symbol PUCCH format 1 (603), the disclosure may be applied to PUCCH format 1 having any length from 4 symbols to 14 symbols, and PUCCH format 1 may have any of various starting symbols as well as the starting symbol shown in the drawing.

First, in 8-symbol PUCCH format 1 (601), frequency hopping is applied between a $4^{th}$ symbol and a $5^{th}$ symbol such that the number of symbols transmitted at a frequency 604 before frequency hopping is equal to the number of symbols transmitted at a frequency 605 after frequency hopping, which is 4. Second, in 9-symbol PUCCH format 1 (602), frequency hopping is applied between a $4^{th}$ symbol and a $5^{th}$ symbol such that the number of symbols transmitted at a frequency 606 before frequency hopping is similar to the number of symbols transmitted at a frequency 607 after frequency hopping. Third, in 10-symbol long PUCCH (603), frequency hopping is applied between a $5^{th}$ symbol and a $6^{th}$ symbol such that the number of symbols transmitted at a frequency 608 before frequency hopping is equal to the number of symbols transmitted at a frequency 609 after frequency hopping.

In order to cause the number of symbols transmitted in a first hop, which is the frequency before frequency hopping, to be equal or similar to the number of symbols transmitted in a second hop, which is the frequency after frequency hopping, for various numbers of symbols described above, assuming that the number of symbols used in transmission of PUCCHs is n, the number of symbols before frequency hopping may be determined to be flooring(2/n), and the number of symbols after frequency hopping may be determined to be ceiling(n/2).

PUCCH format 1 symbols at a frequency before frequency hopping in the 8-symbol PUCCH format 1 (601) are configured in the sequence of a reference signal 611, uplink control information 612, a reference signal 611, and uplink control information 612. In addition, PUCCH format 1 symbols at a frequency after frequency hopping are configured in the sequence of a reference signal 611, uplink control information 612, a reference signal 611, and uplink control information 612.

PUCCH format 1 symbols at a frequency before frequency hopping in the 9-symbol PUCCH format 1 (602) are configured in the sequence of a reference signal 611, uplink control information 612, a reference signal 611, uplink control information 612, and a reference signal 611. In addition, PUCCH format 1 symbols at a frequency after frequency hopping are configured in the sequence of uplink control information 612, a reference signal 611, uplink control information 612, and a reference signal 611.

PUCCH format 1 symbols at a frequency before frequency hopping in the 10-symbol PUCCH format 1 (603) are configured in the sequence of a reference signal 611, uplink control information 612, a reference signal 611, uplink control information 612, and a reference signal 611. In addition, PUCCH format 1 symbols at a frequency after frequency hopping are configured in the sequence of uplink control information 612, a reference signal 611, uplink control information 612, a reference signal 611, and uplink control information 612.

In PUCCH format 1 (601, 602, or 603) including reference signal systems and uplink control information symbols as described above, spreading code is independently applied to the reference signal symbols and the uplink control information symbols before frequency hopping, and is independently applied to the reference signal symbols and the uplink control information symbols after frequency hopping. Since spreading code is independently applied to the symbols transmitting reference signals and the symbols transmitting uplink control information symbols at a frequency before frequency hopping, and is independently applied to the symbols transmitting reference signals and the symbols transmitting uplink control information symbols at a frequency after frequency hopping, the terminal must receive spreading code indexes for the symbols transmitting reference signals and the symbols transmitting uplink control information before frequency hopping, and spreading code indexes for the symbols transmitting reference signals and the symbols transmitting uplink control information after frequency hopping, respectively.

In order to reduce the payload for transmitting a total of four spreading code indexes described above, the terminal may receive one spreading code index through a higher-layer signal indicating a PUCCH resource, may independently apply the one spreading code to the symbols transmitting reference signals and the symbols transmitting uplink control information before frequency hopping, and may independently apply the one spreading code to the symbols transmitting reference signals and the symbols transmitting uplink control information after frequency hopping, thereby transmitting the same.

Table 7 below shows the length of spreading code for symbols transmitting uplink control information when frequency hopping is enabled or disabled according to the transmission length of each PUCCH format 1.

TABLE 7

| | Spreading code length | | |
|---|---|---|---|
| | Spreading code length applied to symbols transmitting uplink control information in PUCCH format 1 when hopping is disabled in slot | Hopping is enabled in slot | |
| Transmission length of PUCCH format 1 | | Spreading code length applied to symbols transmitting uplink control information in (first hop) before frequency hopping | Spreading code length applied to symbols transmitting uplink control information in (second hop) after frequency hopping |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 2 |
| 12 | 6 | 3 | 3 |
| 13 | 6 | 3 | 3 |
| 14 | 7 | 3 | 4 |

Table 8 below shows the length of spreading code for reference symbols when frequency hopping is enabled or disabled according to the transmission length of each PUCCH format 1.

TABLE 8

| Transmission length of PUCCH format 1 | Spreading code length applied to symbols transmitting reference signal in PUCCH format 1 when hopping is disabled in slot | Spreading code length applied to symbols transmitting reference signal in (first hop) before frequency hopping | Spreading code length applied to symbols transmitting reference signal in (second hop) after frequency hopping |
|---|---|---|---|
| | | Hopping is enabled in slot | |
| 4 | 2 | 1 | 1 |
| 5 | 3 | 1 | 2 |
| 6 | 3 | 2 | 1 |
| 7 | 4 | 2 | 2 |
| 8 | 4 | 2 | 2 |
| 9 | 5 | 2 | 3 |
| 10 | 5 | 3 | 2 |
| 11 | 6 | 3 | 2 |
| 12 | 6 | 3 | 3 |
| 13 | 7 | 3 | 4 |
| 14 | 7 | 4 | 3 |

Therefore, the length of spreading code in FIG. 5 matches the number of symbols, which alternate, for transmitting uplink control information in total transmission symbols of PUCCH format 1, or the number of symbols, which alternate, for transmitting a reference signal therein. In FIG. 6, the length of spreading code in the first hop before frequency hopping matches the number of symbols, which alternate, for transmitting uplink control information in the transmission symbols of the first hop, or the number of symbols, which alternate, for transmitting a reference signal therein, and the length of spreading code in the second hop after frequency hopping matches the number of symbols for transmitting uplink control information, which alternate, in the transmission symbols of the second hop, or the number of symbols for transmitting a reference signal, which alternate, therein.

In this case, the set of possible indexes of spreading code is determined by the length of the spreading code. Referring to Table 2, for example, in the case where the transmission length of PUCCH format 1 is 9 and frequency hopping is disabled, possible indexes of spreading code to be applied to the symbols transmitting uplink control information are 0, 1, 2, and 3, and possible indexes of spreading code to be applied to the symbols transmitting a reference signal are 0, 1, 2, 3, and 4. Therefore, if the base station indicates the index of spreading code to be applied to the symbols transmitting uplink control information and a reference signal as 4, there is a problem in which no spreading code exists to be applied to the symbols transmitting uplink control information.

In addition, in the case where the transmission length of PUCCH format 1 is 14 and frequency hopping is enabled, the length of spreading code to be applied to the symbols transmitting uplink control information is 3 and possible indexes of spreading code are 0, 1, and 2 in the first hop, and the length of spreading code to be applied to the symbols transmitting uplink control information is 4 and possible indexes of spreading code are 0, 1, 2, and 3 in the second hop. The length of spreading code to be applied to the symbols transmitting a reference signal is 4 and possible indexes of spreading code are 0, 1, 2, and 3 in the first hop, and the length of spreading code to be applied to the symbols transmitting a reference signal is 3 and possible indexes of spreading code are 0, 1, and 2 in the second hop. Therefore, if the base station indicates the index of spreading code to be applied to the symbols transmitting uplink control information as 3, there is a problem in which no spreading code exists to be applied to the symbols transmitting the uplink control information in the first hop and the symbols transmitting a reference signal in the second hop.

Accordingly, in order to solve the above problem, the disclosure provides methods for the base station to configure the indexes of spreading code.

A first method is one in which the base station determines the minimum value of the length of spreading code to be applied to the symbols transmitting uplink control information and the length of spreading code to be applied to the symbols transmitting a reference signal in Tables 7 and 8 depending on the transmission length of PUCCH format 1 and enablement or disablement of frequency hopping to be the length of spreading code (to be applied), and determines possible indexes of spreading code, based on the length of spreading code.

Therefore, if frequency hopping is enabled, the base station compares the length of spreading code to be applied to the symbols transmitting uplink control information with the length of spreading code to be applied to the symbols transmitting a reference signal in the first hop and the second hop, determines the minimum value thereof to be the length of spreading code to be applied, and determines possible indexes i of spreading code according to the determined length of spreading code with reference to Table 2. In addition, if frequency hopping is disabled, the base station compares the length of spreading code to be applied to the symbols transmitting uplink control information with the length of spreading code to be applied to the symbols transmitting a reference signal, determines the minimum value thereof to be the length of spreading code to be applied, and determines possible indexes i of spreading code according to the determined length of spreading code with reference to Table 2.

For example, the case where PUCCH format 1 has a transmission length of 11 symbols is considered. If frequency hopping is enabled, the length of spreading code to be applied to the symbols transmitting uplink control information is 2, and the length of spreading code to be applied to the symbols transmitting a reference signal is 3 in the first hop. The length of spreading code to be applied to the symbols transmitting uplink control information is 3, and the length of spreading code to be applied to the symbols transmitting a reference signal is 3 in the second hop. In this case, the base station determines the length of spreading code to be applied to be 2, and determines possible indexes i of spreading code according thereto. That is, the possible indexes may be 0 and 1. If frequency hopping is disabled, the length of spreading code to be applied to the symbols transmitting uplink control information is 5, and the length of spreading code to be applied to the symbols transmitting a reference signal is 6. In this case, the base station determines the length of spreading code to be applied to be 5, and determines possible indexes i of spreading code according thereto. That is, the possible indexes may be 0 to 4.

In this case, when frequency hopping is enabled, the base station may indicate, for example, a spreading code index 1 to the terminal, and the terminal receiving index information applies spreading code of length 2 and index 1 to the symbols transmitting uplink control information in the first hop, and applies spreading code of length 3 and index 1 to the symbols transmitting a reference signal in the first hop. In addition, the terminal applies spreading code of length 3 and index 1 to the symbols transmitting uplink control information in the second hop, and applies spreading code of length 3 and index 1 to the symbols transmitting a reference signal in the second hop.

In addition, when frequency hopping is disabled, the base station may indicate, for example, a spreading code index 4 to the terminal, and the terminal receiving index information applies spreading code of length 5 and index 4 to the symbols transmitting uplink control information, and applies spreading code of length 6 and index 4 to the symbols transmitting a reference signal. This operation of the terminal may be applied in the same manner as in the case where other methods are applied. A second method is one in which the base station determines a minimum value of the length of spreading code to be applied to the symbols transmitting uplink control information in Table 7, depending on the transmission length of PUCCH format 1 and enablement or disablement of frequency hopping, to be the length of spreading code to be applied, and determines possible indexes of spreading code, based on the length of spreading code.

Therefore, if frequency hopping is enabled, the base station compares the length of spreading code to be applied to the symbols transmitting uplink control information in the first hop and the second hop, determines the minimum value thereof to be the length of spreading code to be applied, and determines possible indexes i of spreading code according to the determined length of spreading code with reference to Table 2. In addition, if frequency hopping is disabled, the base station determines the length of spreading code to be applied to the symbols transmitting uplink control information to be the length of spreading code to be applied, and determines possible indexes i of spreading code according to the determined length of spreading code with reference to Table 2.

For example, the case where PUCCH format 1 has a transmission length of 11 symbols is considered. If frequency hopping is enabled, the length of spreading code to be applied to the symbols transmitting uplink control information is 2 in the first hop, and the length of spreading code to be applied to the symbols transmitting uplink control information is 3 in the second hop. In this case, the base station determines the length of spreading code to be applied to be 2, and determines possible indexes i of spreading code according thereto. That is, the possible indexes may be 0 and 1. If frequency hopping is disabled, since the length of spreading code to be applied to the symbols transmitting uplink control information is 5, the base station determines the length of spreading code to be applied to be 5, and determines possible indexes i of spreading code according thereto. That is, the possible indexes may be 0 to 4.

A third method is a method in which the base station determines the specific value of the length of spreading code to be applied to the symbols transmitting uplink control information in Table 7, depending on the transmission length of PUCCH format 1 and enablement or disablement of frequency hopping, to be the length of spreading code to be applied, and determines possible indexes of spreading code, based on the length of the spreading code.

For example, if frequency hopping is enabled, the base station determines the length of the spreading code to be applied to the symbols transmitting uplink control information in the first hop to be the length of spreading code to be applied, and determines possible indexes i of spreading code according to the determined length of spreading code with reference to Table 2. For example, if frequency hopping is disabled, the base station determines the length of the spreading code to be applied to the symbols transmitting uplink control information to be the length of spreading code to be applied, and determines possible indexes i of spreading code according to the determined length of spreading code with reference to Table 2.

For example, the case where PUCCH format 1 has a transmission length of 11 symbols is considered. If frequency hopping is enabled, since the length of the spreading code to be applied to the symbols transmitting uplink control information is 2 in the first hop according to Table 7, the base station determines the length of spreading code to be applied to be 2, and determines possible indexes i of spreading code according thereto. That is, the possible indexes may be 0 and 1. If frequency hopping is disabled, since the length of the spreading code to be applied to the symbols transmitting uplink control information is 5 according to Table 7, the base station determines the length of spreading code to be applied to be 5, and determines possible indexes i of spreading code according thereto. That is, the possible indexes may be 0 to 4.

A fourth method is one in which the base station determines the length of spreading code, based on an equation depending on the transmission length of PUCCH format 1 and enablement or disablement of frequency hopping, and determines possible indexes of spreading code, based on the length of spreading code. For example, if frequency hopping is enabled, the base station determines the length of spreading code to be flooring(n/4), and determines possible indexes i of spreading code according to the determined length of spreading code with reference to Table 2. For example, if frequency hopping is disabled, the base station determines the length of spreading code to be flooring(n/2), and determines possible indexes i of spreading code according to the determined length of spreading code with reference to Table 2. "n" above is the number of symbols corresponding to the transmission length of PUCCH format 1.

For example, if PUCCH format 1 has a length of 11 symbols, and if frequency hopping is enabled, the length of spreading code is flooring(11/4)=2, and in this case, the possible indexes i of spreading code are 0 and 1. If frequency hopping is disabled, the length of spreading code is flooring (11/2)=5, and in this case, the possible indexes i of spreading code are 0 to 4.

As a fifth method, it is possible for the base station to determine the length of spreading code through a combination of at least one or more of the first to fourth methods, and to determine possible indexes of spreading code, based on the length of the spreading code. A combination of the above methods may be realized in various ways, and the following is provided as an example of a combination of the above methods. For example, if the base station enables frequency hopping, the base station may compare the length of spreading code to be applied to the symbols transmitting uplink control information in the first hop and the second hop, and may determine the minimum value thereof to be the length of spreading code to be applied according to the second method, thereby determining possible indexes 1 of spreading code, based on the determined length of spreading code with reference to Table 2. If the base station disables frequency hopping, the base station may determine the length of spreading code to be applied to the symbols transmitting uplink control information to be the length of spreading code to be applied according to the third method, and may determine possible indexes 1 of spreading code, based on the determined length of spreading code with reference to Table 2.

Although the above methods have been described as methods of comparing the length of spreading code to be applied to an uplink control signal or/and a demodulated reference signal, this may also be understood as the number of symbols transmitting an uplink control signal or/and the number of symbols transmitting a demodulated reference signal.

Figure 7A:
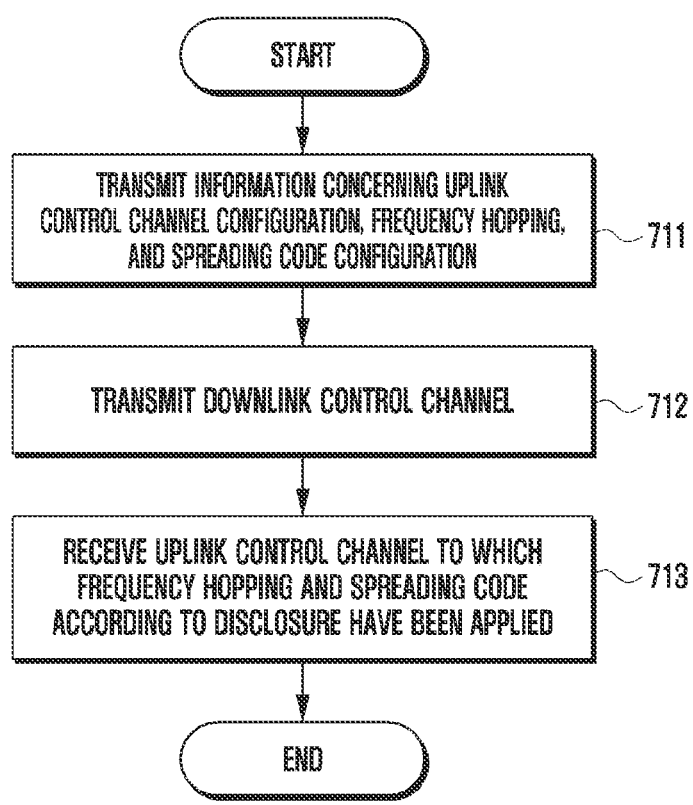
FIG. 7A is a diagram illustrating the procedure of a base station according to embodiments of the disclosure.
Figure 7B:
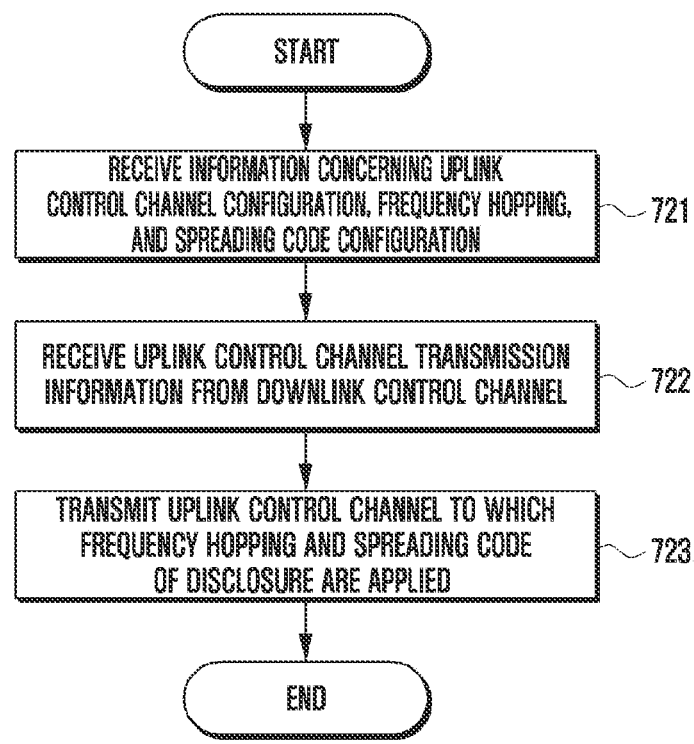
FIG. 7B is a diagram illustrating the procedure of a terminal according to embodiments of the disclosure.

FIGS. 7A and 7B are diagrams illustrating procedures of a base station and a terminal according to embodiments of the disclosure.

FIG. 7A is a diagram illustrating the procedure of a base station.

In step 711, the base station transmits uplink control channel configuration and frequency hopping configuration information to the terminal. The uplink control channel configuration information includes PUCCH resources, as described in the disclosure, and includes PUCCH resources for the terminal to transmit PUCCH format 1. The frequency hopping and spreading code configuration information includes configuration information necessary for configuration of frequency hopping and application of spreading code of PUCCH format 1 as described in the disclosure, and the base station may determine the index of spreading code according to the methods proposed in the disclosure, and may transmit the same to the terminal.

In step 712, the base station transmits a downlink control channel to the terminal. The downlink control channel may include information indicating specific information among the information included in the PUCCH resource. The downlink control channel may be common information for a group of terminals or all terminals in a cell, or may be dedicated information transmitted only to a specific terminal.

In step 713, the base station receives, from the terminal, an uplink control channel including PUCCH format 1 to which frequency hopping and spreading code are applied in the frequency resource at the transmission time, including a PUCCH resource, indicated in step 711 or 712.

FIG. 7B is a diagram illustrating the procedure of a terminal.

In step 721, the terminal receives uplink control channel configuration information from the base station. The uplink control channel configuration information includes PUCCH resources, as described in the disclosure, and includes PUCCH resources for the terminal to transmit PUCCH format 1. The frequency hopping and spreading code configuration information includes configuration information necessary for configuration of frequency hopping and application of spreading code of PUCCH format 1 as described in the disclosure, and the terminal may receive an index of spreading code determined according to the methods proposed in the disclosure.

In step 722, the terminal receives a downlink control channel from the base station. The downlink control channel may include information indicating specific information among the information included in the PUCCH resource. The downlink control channel may be common information for a group of terminals or all terminals in a cell, or may be dedicated information transmitted only to a specific terminal.

In step 723, the terminal applies spreading code having the index of spreading code configured in the above step in the frequency resource, applies or does not apply frequency hopping according to the frequency hopping configuration information, and transmits uplink control channel to the base station at the transmission time, including a PUCCH resource, received in step 721 or 722.

Figure 8:
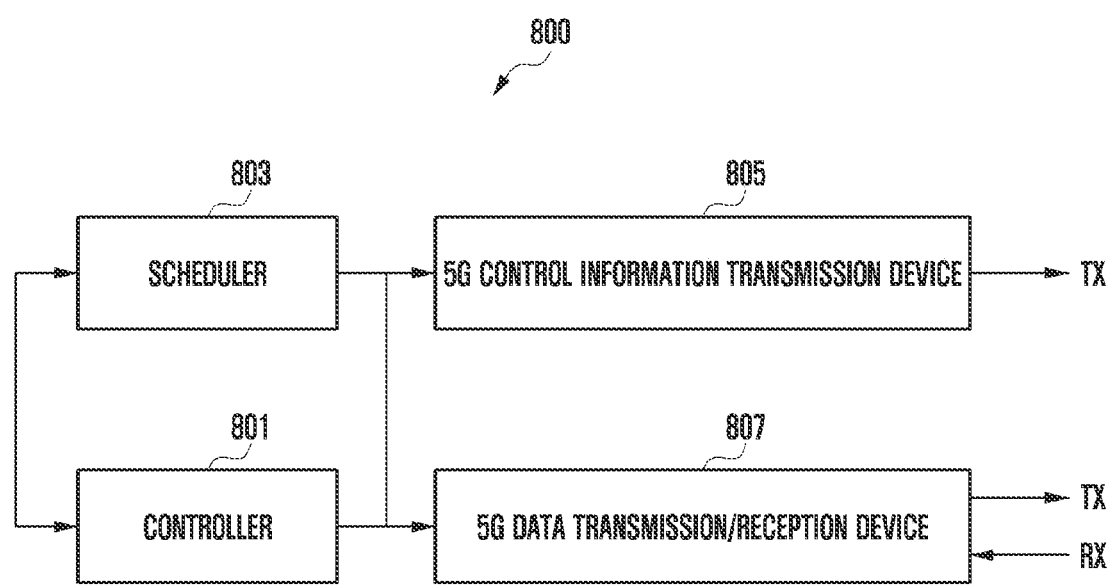
FIG. 8 is a diagram illustrating a base station device according to the disclosure.

Next, FIG. 8 is a diagram illustrating a base station device according to the disclosure.

A base station device 800 may include a controller 801, a scheduler 803, a 5G control information transmission device 805, and a 5G data transmission/reception device 807. The controller 801 controls uplink control channel transmission resources according to the procedure of a base station according to the disclosure, and configuration of an uplink control channel, the method of configuring time and frequency transmission resources in the uplink control channel, the method of configuring and applying frequency hopping, and the method of applying spreading code according to the disclosure, transmits the same to the terminal through the 5G control information transmission device 805 and the 5G data transmission/reception device 807, schedules 5G data using the scheduler 803, and transmits and receives 5G data to and from a 5G terminal through the 5G data transmission/reception device 807.

Figure 9:
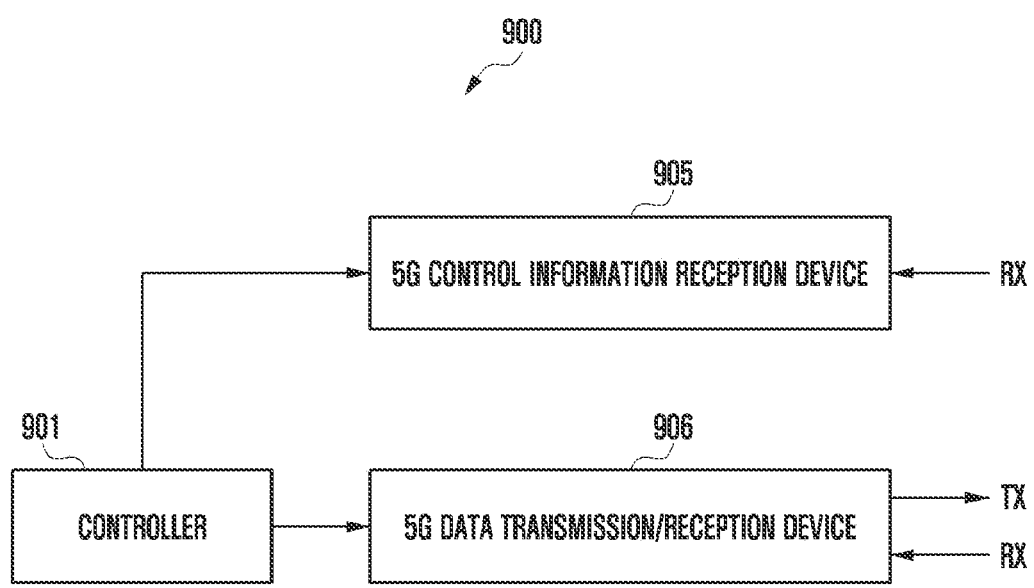
FIG. 9 is a diagram illustrating a base station device according to the disclosure.

Next, FIG. 9 is a diagram illustrating a terminal device according to the disclosure.

A terminal device 900 may include a controller 901, a 5G control information reception device 905, and a 5G data transmission/reception device 906. The controller 901 receives, from the base station, the positions of uplink control channel transmission resources through the 5G control information reception device 905 and the 5G data transmission/reception device 906 according to the procedure of a terminal of the disclosure, and configuration of an uplink control channel, the method of configuring time and frequency transmission resources in the uplink control channel, the method of configuring and applying frequency hopping, and the method of applying spreading code according to the disclosure, and transmits and receives scheduled 5G data to and from a 5G base station at the received resource positions through the 5G data transmission/reception device 906.

The embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. Therefore, the scope of various embodiments of the disclosure should be construed to include, in addition to the embodiments disclosed herein, all changes and modifications derived on the basis of the technical idea of the disclosure.

The invention claimed is:

1. A method of transmitting uplink control information (UCI) by a terminal in a wireless communication system, the method comprising:

receiving, from a base station, physical uplink control channel (PUCCH) configuration information comprising spreading code index information; and transmitting, to the base station, the UCI and a demodulation reference signal (DMRS) in a PUCCH corresponding to PUCCH format 1, based on the spreading code index information, wherein the spreading code index information is determined based on a minimum value among a length of spreading code to be applied to a symbol for the UCI and a length of spreading code to be applied to a symbol for the DMRS.

2. The method of claim 1, wherein the PUCCH configuration information further comprises information indicating whether frequency hopping is enabled or disabled, wherein if frequency hopping is enabled, the spreading code index information is determined based on a length of spreading code to be applied to a symbol in which UCI is transmitted in a first hop or a length of spreading code to be applied to a symbol in which UCI is transmitted in a second hop, and wherein if frequency hopping is disabled, the spreading code index information is determined based on a length of spreading code to be applied to a symbol in which the UCI is transmitted.

3. The method of claim 2, wherein if frequency hopping is enabled, the spreading code index information is determined based on a smaller value of the length of spreading code to be applied to the symbol in which the UCI is transmitted in the first hop and the length of spreading code to be applied to the symbol in which the UCI is transmitted in the second hop.

4. The method of claim 1, further comprising receiving downlink control information (DCI) from the base station,
wherein the DCI comprises information indicating a PUCCH resource, and
wherein the UCI is transmitted through the PUCCH resource.

5. A method of receiving uplink control information (UCI) by a base station in a wireless communication system, the method comprising:
transmitting, to a terminal, physical uplink control channel (PUCCH) configuration information comprising spreading code index information; and
receiving, from the terminal, the UCI and a demodulation reference signal (DMRS) in a PUCCH corresponding to PUCCH format 1, based on the spreading code index information,
wherein the spreading code index information is determined based on a minimum value among a length of spreading code to be applied to a symbol for the UCI and a length of spreading code to be applied to a symbol for the DMRS.

6. The method of claim 5, wherein the PUCCH configuration information further comprises information indicating whether frequency hopping is enabled or disabled,
wherein if frequency hopping is enabled, the spreading code index information is determined based on a length of spreading code to be applied to a symbol in which UCI is transmitted in a first hop or a length of spreading code to be applied to a symbol in which UCI is transmitted in a second hop, and
wherein if frequency hopping is disabled, the spreading code index information is determined based on a length of spreading code to be applied to a symbol in which the UCI is transmitted.

7. The method of claim 6, wherein if frequency hopping is enabled, the spreading code index information is determined based on a smaller value of the length of spreading code to be applied to the symbol in which the UCI is transmitted in the first hop and the length of spreading code to be applied to the symbol in which the UCI is transmitted in the second hop.

8. The method of claim 5, further comprising transmitting downlink control information (DCI) to the terminal,
wherein the DCI comprises information indicating a PUCCH resource, and
wherein the UCI is transmitted through the PUCCH resource.

9. A terminal for transmitting uplink control information (UCI) in a wireless communication system, the terminal comprising:

a transceiver; and
a controller connected to the transceiver and configured to:
receive, from a base station, physical uplink control channel (PUCCH) configuration information comprising spreading code index information, and
transmit, to the base station, the UCI and a demodulation reference signal (DMRS) in a PUCCH corresponding to PUCCH format 1, based on the spreading code index information,
wherein the spreading code index information is determined based on a minimum value among a length of spreading code to be applied to a symbol for the UCI and a length of spreading code to be applied to a symbol for the DMRS.

10. The terminal of claim 9, wherein the PUCCH configuration information further comprises information indicating whether frequency hopping is enabled or disabled,
wherein if frequency hopping is enabled, the spreading code index information is determined based on a length of spreading code to be applied to a symbol in which UCI is transmitted in a first hop or a length of spreading code to be applied to a symbol in which UCI is transmitted in a second hop, and
wherein if frequency hopping is disabled, the spreading code index information is determined based on a length of spreading code to be applied to a symbol in which the UCI is transmitted.

11. The terminal of claim 10, wherein if frequency hopping is enabled, the spreading code index information is determined based on a smaller value of the length of spreading code to be applied to the symbol in which the UCI is transmitted in the first hop and the length of spreading code to be applied to the symbol in which the UCI is transmitted in the second hop.

12. The terminal of claim 9, wherein the controller further performs control so as to receive downlink control information (DCI) from the base station,
wherein the DCI comprises information indicating a PUCCH resource, and
wherein the UCI is transmitted through the PUCCH resource.

13. A base station for receiving uplink control information (UCI) in a wireless communication system, the base station comprising:
a transceiver; and
a controller connected to the transceiver and configured to:
transmit, to a terminal, physical uplink control channel (PUCCH) configuration information comprising spreading code index information, and
receive, from the terminal, the UCI and a demodulation reference signal (DMRS) in a PUCCH corresponding to PUCCH format 1, based on the spreading code index information,
wherein the spreading code index information is determined based on a minimum value among a length of spreading code to be applied to a symbol for the UCI and a length of spreading code to be applied to a symbol for the DMRS.

14. The base station of claim 13, wherein the PUCCH configuration information further comprises information indicating whether frequency hopping is enabled or disabled,
wherein if frequency hopping is enabled, the spreading code index information is determined based on a length of spreading code to be applied to a symbol in which UCI is transmitted in a first hop or a length of spreading code to be applied to a symbol in which UCI is transmitted in a second hop, and wherein if frequency hopping is disabled, the spreading code index information is determined based on a length of spreading code to be applied to a symbol in which the UCI is transmitted.

15. The base station of claim 14, wherein if frequency hopping is enabled, the spreading code index information is determined based on a smaller value of the length of spreading code to be applied to the symbol in which the UCI is transmitted in the first hop and the length of spreading code to be applied to the symbol in which the UCI is transmitted in the second hop.

* * * * *